United States Patent [19]
Fleischer

[11] 3,945,605
[45] Mar. 23, 1976

[54] MULTIPLE PLATE VALVE

[76] Inventor: Henry Fleischer, 18 Notch Park Road, Little Falls, N.J. 07424

[22] Filed: Jan. 20, 1975

[21] Appl. No.: 542,104

Related U.S. Application Data

[63] Continuation-in-part of Ser. No. 382,961, July 26, 1973, Pat. No. 3,880,402.

[52] U.S. Cl. ............... 251/212; 251/248; 251/235
[51] Int. Cl.² .......................................... F16K 3/00
[58] Field of Search .......... 251/319, 206, 212, 304, 251/248–250.5, 280, 235

[56] References Cited
UNITED STATES PATENTS
2,878,829    3/1959    Folmsbee ...................... 251/248 X

*Primary Examiner*—Henry T. Klinksiek

[57] ABSTRACT

A multiple plate valve is provided which is designed to continue to function to close off a conduit even after portions of the valve have worn. The valve includes a body portion in the form of a pair of outer cover members each having an aperture therein, at least a pair of closure members, such as plates, operatively retained between said outer cover members and adapted to be moved between open and closed positions and to cooperate with each other to close off the apertures in the outer cover members, and means for repositioning the closure members with respect to each other and the apertures, as the closure members wear out, so that the closure members will continue to cooperate with each other to close off the apertures.

Such a valve is particularly useful where it is employed in a conduit used for delivering abrasives or caustic chemicals which tend to wear out the closure members of the valve.

61 Claims, 40 Drawing Figures

U.S. Patent   March 23, 1976   Sheet 1 of 17   3,945,605
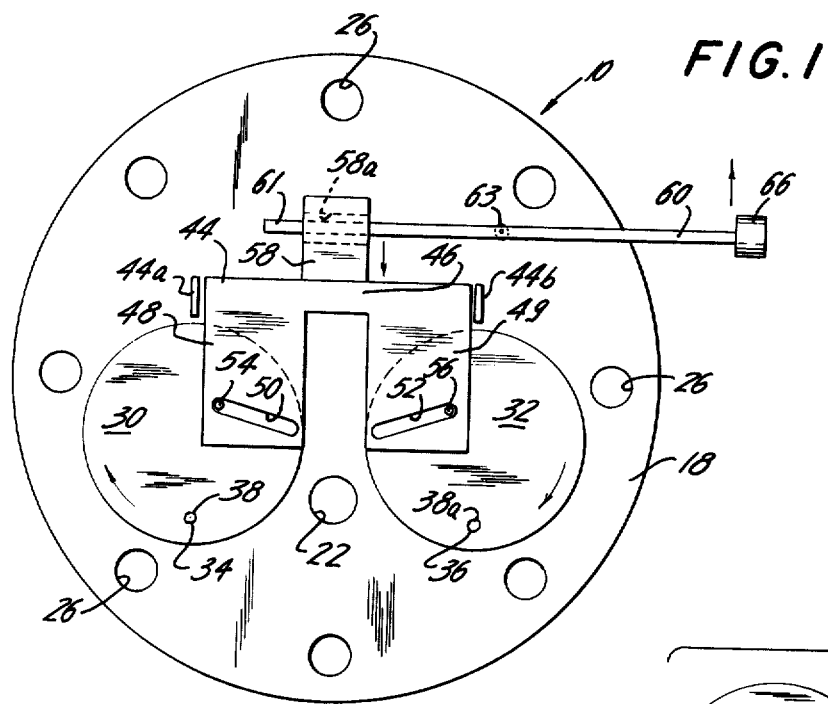
FIG.1
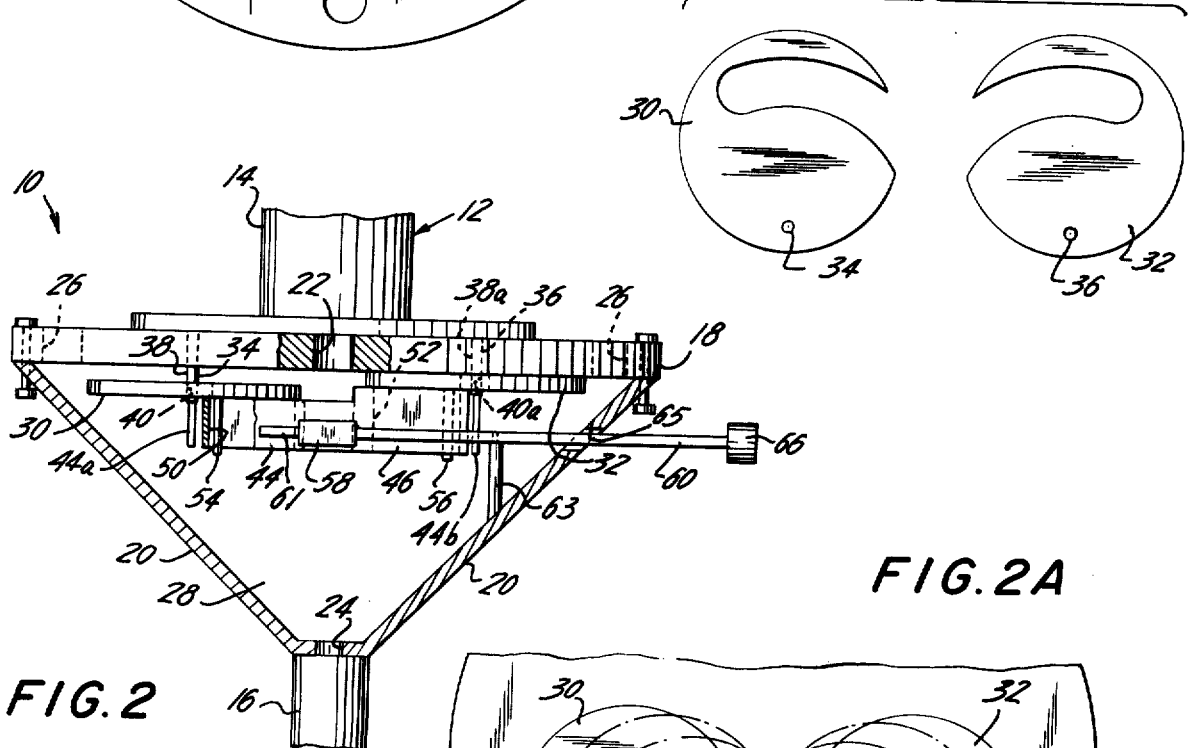
FIG.1A
FIG.2
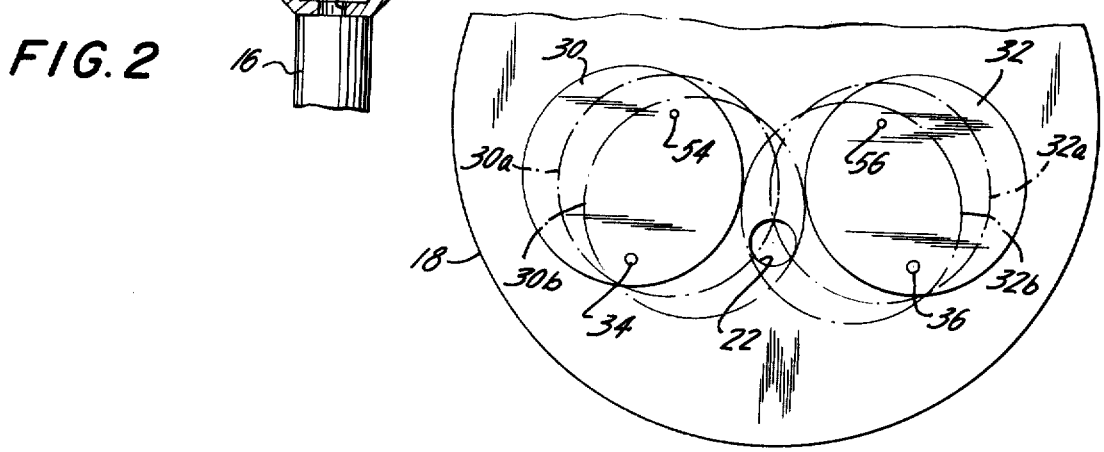
FIG.2A

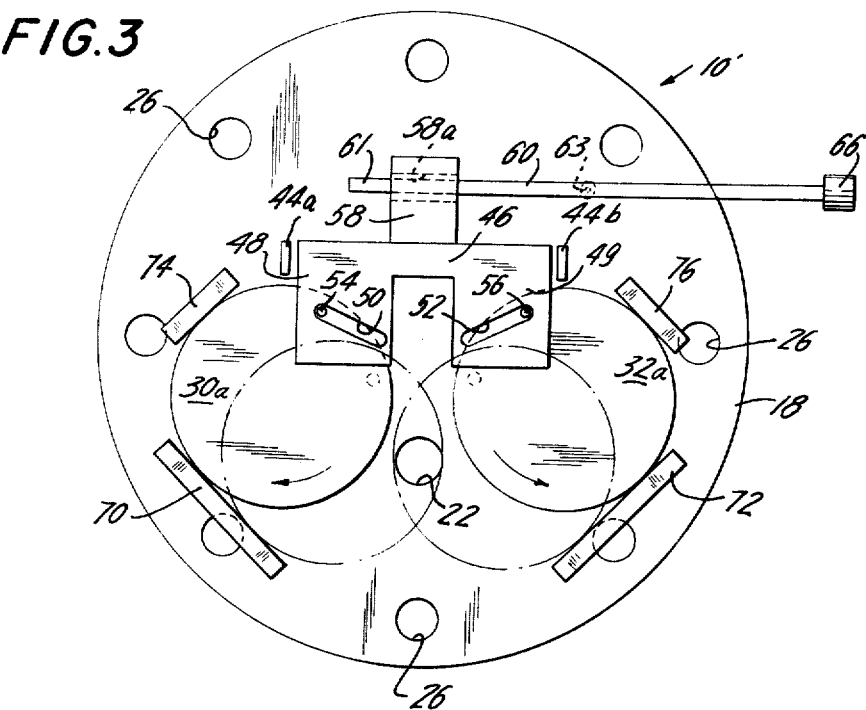

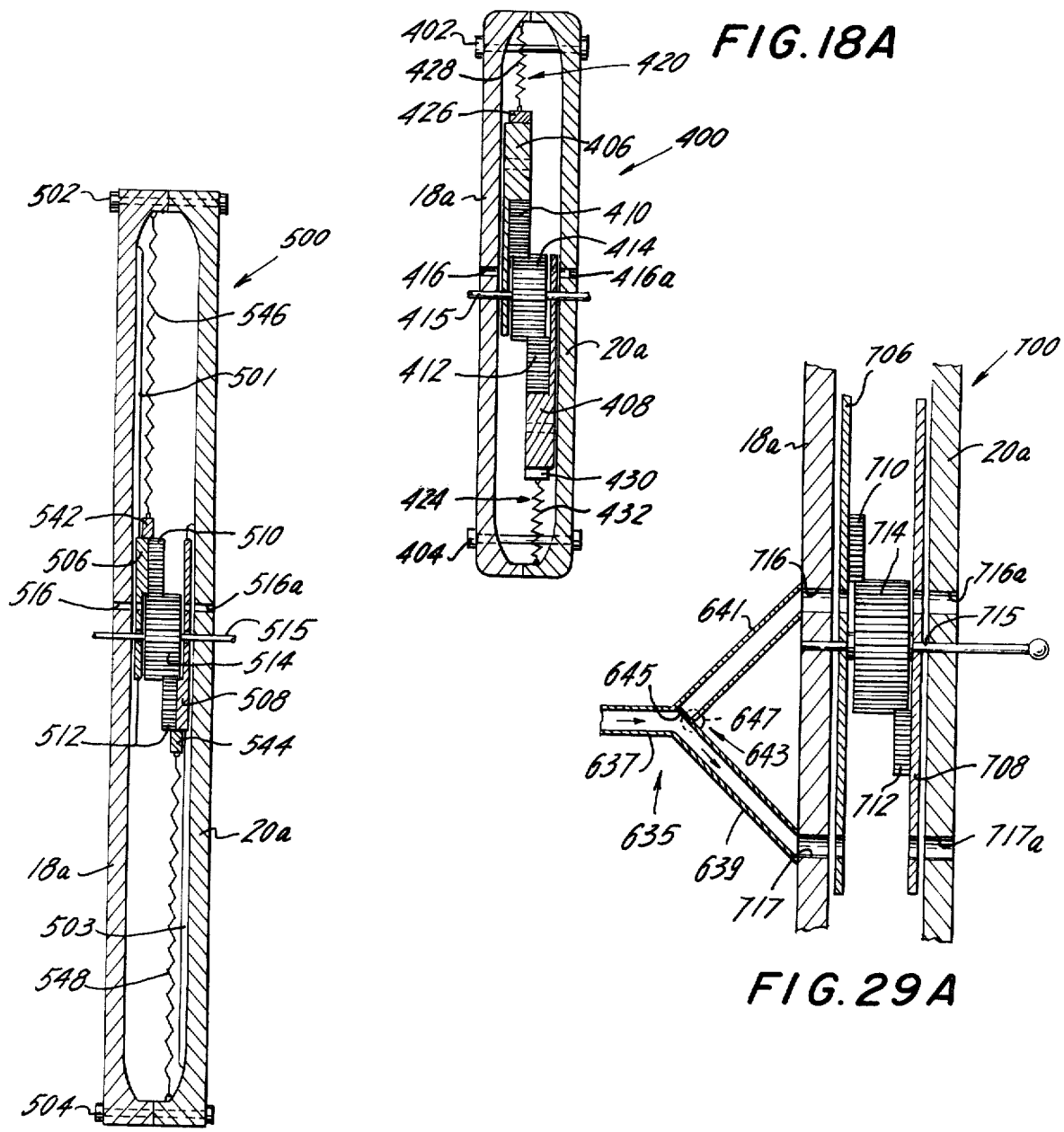

MULTIPLE PLATE VALVE

REFERENCE TO OTHER APPLICATIONS

This application is a continuation-in-part application of copending application Ser. No. 382,961, filed July 26, 1973, now U.S. Pat. No. 3,880,402.

FIELD OF THE INVENTION

The present invention relates to a multiple plate valve which includes at least two closure members which cooperate with each other in opening and closing the valve. Such a valve is particularly adapted to handle flow of abrasive materials.

BACKGROUND OF THE INVENTION

Conventional valves employed in conjunction with equipment for delivering a flow of abrasive materials, such as sand blasting equipment, normally have a relatively short working life. Such valves generally comprise a valve body which includes an opening therein, and a plate member housed in said body and which includes an opening therein. The plate member can be manipulated from outside of the valve body to open the valve in which case the opening in said plate member is moved into alignment over the opening in the valve body so as to allow abrasive material to flow through the valve. The valve is closed to stop flow of abrasives therethrough by merely manipulating the plate member so that the opening therein is moved out of alignment and away from the opening in the valve body so that said openings in no way overlap. As the valve is moved from its open position to its closed position and vice versa, the plate member, specifically that area surrounding the opening therein, comes into direct contact with abrasive or caustic material. This action causes wear about the opening in the plate member. The amount of wear produced will depend upon the type of abrasive or caustic employed, the rate of flow thereof through the valve and the number of times the valve is opened and closed. Eventually, and usually within a relatively short time, the abrasive etc. will cause sufficient wear of the plate member so that the opening therein will be so large as to make it impossible to close off the valve. At this stage, the valve becomes useless and can only be made operable by replacing the worn out plate member with another plate member. Depending upon the design of the valve, this is at the least, an expensive and frequent maintenance operation since the plate members required wear out quickly and are costly. At the most, it is impossible to replace the worn out plate members and thus, the worn valve would have to be discarded and replaced with a new valve.

BRIEF STATEMENT OF THE INVENTION

In accordance with the present invention, there is provided a multiple plate valve which can be employed in conjunction with equipment designed for delivering abrasive or caustic materials, such as sand-blasting equipment, and which overcomes the maintenance and replacement problems associated with the prior art valve described hereinbefore. Applicant overcomes such problems by replacing the plate member of the prior art valve with at least two closure or plate members which are designed to move between spaced and overlapping positions corresponding to open and closed positions, respectively, and which can be periodically repositioned with respect to each other as each plate wears, so that the plates can continue to cooperate with each other to close off the valve.

The multiple plate valve of the invention includes a body portion, which can take the form of a pair of outer cover members each having an aperture therein, at least a pair of closure members, such as plates, operatively disposed and retained within said body portion and adapted to be moved between open and closed positions and to cooperate with each other to close off the apertures in the body portion, and means for repositioning the closure members with respect to each other and the apertures, as the closure members wear out, so that the closure members will continue to cooperate with each other to close off the valve.

Such a valve may be employed for many uses as will be apparent to one skilled in the art and is particularly useful where it is employed in a conduit used for delivering abrasives, etc., which tend to wear out the closure members of the valve.

In one aspect of the multiple plate valve of the invention, the closure members comprise a pair of circular plates or disks, or plates of other shape such as oblong, square, etc., which are spaced apart from each other and are eccentrically and pivotally mounted on the body portion for movement into and out of overlapping relationship with each other for closing off the apertures in the body portion or alternately allowing flow of material through the opening of the body portion. The valve also includes means for repositioning the plates with respect to each other as the plates wear out. Such means for repositioning the plates will provide increasing pivotal movement of each plate toward each other to provide greater overlapping of each plate with the other so that the plates can continue to cooperate with each other to close off the apertures in the body portion as the plates continue to wear or if the plates wear unevenly.

In another aspect of the multiple plate valve of the present invention, the closure members can comprise a pair of plates each of which includes a plurality of teeth, and ratchet or other gear means for engaging corresponding teeth on said plates, said gear means being adapted to cause movement of said plates into open and closed positions over the apertures in the body portion. As the plates wear out, the gear means can be used to cause movement of said plates in a manner such the unworn sections of the plates can continue to cooperate with each other to close off the apertures in the body portion.

Any conventional means may be employed to reposition the closure members from outside of the valve, regardless of whether gear means are employed to move the closure members. Where gear means are employed, any conventional means, such as a shaft member or worm gear connected to the gear means and extending outside the valve, may be employed to cause movement of the gear means and resultant movement of the closure members.

It will be apparent to those skilled in the art that the multiple plate valve of the invention may include more than two closure members, and may in fact include three, four or more closure members which can cooperate with each other to close off one, or even two or more apertures in the body portion of the valve.

It will be understood that in the various embodiments of the multiple plate valve of the invention, the closure members are housed in and may be supported by a pair of cover plates as will be seen hereinafter and in many of such embodiments, the one or both covers function as the valve body.

BRIEF DESCRIPTION OF THE FIGURES

FIG. 1 is a view of a multiple plate valve in accordance with the present invention which includes a pair of closure members, in the form of circular disks and wherein one outer cover member has been removed;

FIG. 1A is a view of the closure members of FIG. 1 in a partially worn condition;

FIG. 2 is a side view of the valve shown in FIG. 1;

FIG. 2A is a fragmentary view of the valve shown in FIG. 1, wherein various positions of the closure members are indicated by phantom lines;

FIG. 3 is a view of another embodiment of the valve of the invention wherein one outer cover member has been removed;

FIG. 4 is a side view of the valve shown in FIG. 3;

FIG. 18A is a side sectional view of the valve shown in FIG. 18 including both outer cover members;

FIG. 21A is a side sectional view of the valve shown in FIG. 21 including both outer cover members;

FIG. 29A is a side view of the valve shown in FIG. 28 including both outer cover members.

DETAILED DESCRIPTION OF THE FIGURES

Figure 5:
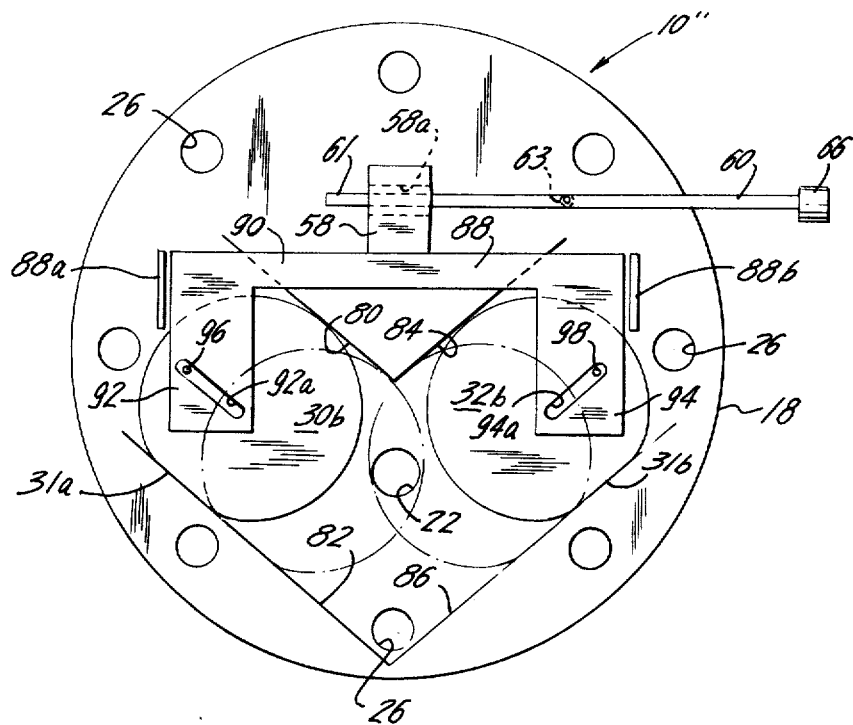
FIG. 5 is a view of yet another multiple plate valve in accordance with the present invention wherein one outer cover member has been removed.

Referring to the accompanying drawings wherein like numerals refer to the like parts in the several views, FIGS. 1, 1A and 2 illustrate one of the embodiments of the multiple plate valve of the inventions indicated generally by the numeral 10.

The valve 10 is mounted in a conduit generally referred to by the numeral 12 which includes conduit portions 14 and 16, as shown in FIG. 2. The conduit portion 14 may be connected to a sand or other abrasive supply tank which may also include water or other liquid, and conduit portion 16 may be connected to an abrasive delivery nozzle or hose. The valve 10 includes outer cover plates 18 and 20, only cover plate 18 being shown in FIG. 1. Cover plate 18 includes an aperture or hole 22 which is in alignment with the interior of conduit 14; cover plate 20 includes an aperture generally shown by the numeral 24 (FIG. 2) which is in alignment with aperture 22 in cover plate 18. In this embodiment, the valve body is actually defined by the cover plates 18 and 20 and the area between these cover plates. Cover plates 18 and 20 are secured to each other by any conventional means such as by a plurality of nuts and bolts which are adapted to engage the openings 26 in cover plate 18 and similar openings in cover plate 20, said openings in cover plate 20 not being shown for purposes of clarity.

Disposed within the internal chamber 28 (shown in FIG. 2) defined by the area formed between the cover plates 18 and 20, are closure members 30 and 32. Closure members 30 and 32 as illustrated take the form of a pair of circular disks or plates which are eccentrically and pivotally mounted on cover plate 18 by means of pivot mounting means generally referred to by the numerals 34 and 36, respectively. Pivot mounting means 34 and 36 generally comprise shafts 38 and 38a, respectively, which pass through off-centered bores 40 and 40a, respectively, in disks 30 and 32, respectively.

Disks 30 and 32 are adapted to be pivotally moved about shafts 38 and 38a, respectively, from the position shown in FIGS. 1 and 2 (which is the open position) into overlapping relationship with each other so as to close off the aperture 22 in the cover plate 18. In addition, disks 30 and 32 are adapted to be moved from such overlapping position (the closed position) away from each other so as to clear the aperture 22 and allow material flowing through conduit portion 14 to flow through the cover plate 18 via aperture 22 into the internal chamber 28 and through the aperture 24 in cover plate 20 and finally into conduit portion 16. This can be accomplished by applying an upward force to each of the disks 30 and 32 so that said disks 30 and 32 pivot on shafts 38, 38a which causes rotation of disk 32 in a clockwise direction and rotation of disk 30 in a counter-clockwise direction so that the disks 30 and 32 move out of overlapping relationship with each other away from the aperture 22 in cover plate 18 and thereby clear the aperture 22. The disks 30 and 32 can then be made to move into overlapping relationship with each other and over the aperture 22 by applying a downward force to the disks 30 and 32 about the pivot means 34 and 36, which causes counter-clockwise rotation of disk 32 and clockwise rotation of disk 30 about the shafts 38a, 38. Such movement is shown in FIG. 2A. As shown in FIG. 2A, the position of disks 30 and 32 represented by the solid lines is the open position allowing flow of material through the aperture 22 and cover plate 18. As a downward force is applied to disks 30 and 32 thereby causing said disks to pivot about pivot means 34 and 36, respectively, the disks 30 and 32 move from their open position to the position indicated by the phantom lines 30a and 32a, which is a partially closed position, to their overlapping and closed position as represented by the phantom lines 30b and 32b. The disks 30 and 32 may then be moved from their closed and overlapping position back to their open position by applying an upward force to said disks along or about the pivot means 34 and 36, respectively, so that the disk move from their closed position to the partially closed position as represented by the phantom lines 30a and 32a and back to their open position as indicated by the solid lines 30 and 32, respectively.

The means employed for effecting the movement of the disks 30 and 32 are shown in FIGS. 1 and 2 and include U-shaped member 44 which includes horizontal leg 46 and vertical legs 48 and 49, which include angled slots 50 and 52, respectively, which are adapted to engage pins 54 and 56 which are eccentrically mounted on disks 30 and 32, respectively. The downward force necessary to move the disks 30 and 32 into their closed position is provided by merely moving the U-shaped member 44 in a downward direction thereby causing the slots 50 and 52 to ride downwardly so that the walls of slots 50 and 52, respectively, of vertical legs 48 and 49, engage and contact the shafts 38, 38a causing the disks 30, 32 to move downwardly each other in clockwise and counter-clockwise directions, respectively. Such a downward force can be applied to the U-shaped member 44 through member 58 (shown in FIG. 1), which is connected to the U-shaped member 44, as shown. Likewise, an upward force can be applied against the U-shaped member 44 by means of the elongated member 58. Guide members or ridges 44a and 44b are disposed in cover plate 18 and serve to define an up or down path of travel for the member 44.

The means for applying such forces to the elongated member 58 can comprise any conventional means such as elongated member 60 which may be connected at one end 61 to member 58 which in turn is connected, for example by welds, to member 44 as shown in FIGS. 1 and 2. The member 60 is pivotally connected to one end of rod 63, the other end of rod 63 being connected to the cover plate 20 as shown in FIG. 2, the member 60 then passing through a vertically disposed opening 65 in the cover plate 20 and terminating in a handle portion 66, which is disposed externally of the cover plates 18, 20 and, in fact, externally of the entire valve 10, for easy manipulation.

In a preferred embodiment as shown, the member 58 will include a longitudinal opening 58a (which is about 50% greater in diameter than the width of member 60) through which the member 60 passes and is thereby retained by the member 58. Thus, it will be appreciated that when a downward force is applied to the elongated member 58, by merely lifting handle portion 66, the end 61 pivots downwardly about pivot rod 63 thereby causing member 58 and U-shaped member 44 to move downwardly causing the disks 30 and 32 to move downwardly into their closed position over the aperture 22 in cover plate 18. It will be apparent to one skilled in the art that the disks 30 and 32 can be moved into their open position by merely applying a downward force to the handle portion 66 of member 60.

As the plates or disks 30 and 32 are moved from their closed position to their open position, and vice versa, the disks begin to wear as shown in FIG. 1A due to the action of abrasives on the disks. In such case, the means for repositioning the disks 30 and 32 with respect to each other and the aperture 22 in the cover plate 18, so that the disks will continue to cooperate with each other to close off the aperture, are provided in the same means for applying the upward and downward forces to the disks 30 and 32, namely, the U-shaped member 44 and the member 60 and related components as described hereinbefore. Thus, where the disks 30 and 32 begin to wear (as shown in FIG. 1A) the disks 30 and 32 can be moved into their closed position by merely applying a larger upward force to the handle portion 66, greater than that originally applied to move the disks into their closed position when such disks are in an unworn condition. In this manner, the disks 30 and 32 are made to move a greater distance about pivots 34, 36, so that unworn portions thereof will overlap to continue to close off the aperture 22.

It will be understood that as the disks are continually used as closure members for closing off the aperture 22 in cover plate 18, wear of the disks will continue until the disks are essentially worn from one periphery thereof across the disks to almost another periphery thereof. At this stage, the disk will be completely worn for purposes of the valve of the invention and will have to be replaced.

It will also be understood that the circular disks in the above embodiment as well as in all of the other embodiments described hereinafter, can be replaced by other shaped disks such as oblong disks or even rectangular or square disks, as will be apparent to one skilled in the art. Futhermore, it will be appreciated that all such closure members or disks can be employed to open and close the aperture 24 in the cover plate 20 or open and close both apertures 22 and 24 in cover plates 18 and 20, respectively, which apertures need not necessarily be in alignment with each other.

Referring now to FIGS. 3 and 4 there is shown another embodiment of the multiple plate valve in accordance with the present invention similar to the embodiment shown in FIGS. 1 and 2 and described above. The valve embodiment shown in FIGS. 3 and 4 is identified generally by the numeral 10' and is adapted to be mounted in a conduit 12, which conduit includes portions 14 and 16, as shown in FIG. 4. The valve 10' includes outer cover plates 18 and 20, cover plate 18 including an aperture 22 which is in alignment with the interior of conduit 14 and cover plate 20 including aperture 24 which is in alignment with the aperture 22 in cover plate 18. Closure members 30a and 32a which are shown in the form of circular disks 30a and 32a are disposed in the internal chamber 28 as shown in FIG. 4. The valve 10' includes means associated with each of the circular disks 30 and 32 for defining a path of travel for such disks, which means comprises guide means 70 and 72 which are disposed in and connected to at least one of the cover plates 18, 20 (said guide means 70, 72 being connected to cover plate 18 in the embodiment shown in the Figures). Guide means 70 and 72 may comprise rigid members in the form of metal or plastic strips which are disposed below and to either side of the aperture 22 in the cover plate 18, as shown. The guide means 70, 72 are so disposed that when the disks 30a and 32a are in their open position away from the aperture 22 in the cover plate 18, the peripheral edges of the disks 30a and 32a are in contact with the guide means 70, 72, respectively. The disks 30a and 32a are adapted to be moved along the guide means 70. 72, respectively, into overlapping relationship with each other so as to close off the aperture 22 in the cover plate 18. In a similar vein, the disks 30a and 32a are adapted to be moved from such overlapping position away from each other along the guide means 70 and 72, respectively, so as to clear the aperture 22 and allow material flowing through the conduit portion 14 to flow through the cover plate 18 into the internal chamber 28 and through the cover plate 20 and into the conduit portion 16.

The means employed for effecting movement of the disks 30a and 32a are similar to that shown in FIGS. 1 and 2 and include U-shaped member 44 which includes horizontal leg 46 and vertical legs 48 and 49 which include angled slots 50 and 52, respectively, which slots are adapted to engage pins 54 and 56 which are eccentrically mounted on disks 30a and 32a, respectively, as shown. The member 44 is adapted to travel between guides or ridges 44a and 44b. Elongated member 60 extends through opening 58a in a member 58, and is pivotally connected to rod 63 and extends through the outer cover plate 20 as it passes through slot 65 as shown in the Figures and as described above in conjunction with the valve embodiments shown in FIGS. 1 and 2.

In operation, the valve 10' shown in FIGS. 3 and 4 will function in essentially the same manner as the valve 10 shown in FIGS. 1 and 2 with the exception that the guide members 70 and 72 replace the pivot means 34 and 36 and their associated shafts 38, 38a, respectively.

In order to further define the path of movement of the disks 30a and 32a, stop means 74 and 76 which may take the form of metal or plastic strips, are connected to the cover plate 18 and are disposed above and to either side of the aperture 22 in the cover plate 18 in a manner such that they prevent undesirable movement of the disks 30a and 32a after such disks are raised away from the aperture 22. It will now be appreciated that the guide members 70 and 72 in conjunction with the stop members 74 and 76 define a path of travel for the disks 30a and 32a as they are moved into overlapping relationship and out of overlapping relationship with each other.

Figure 6:
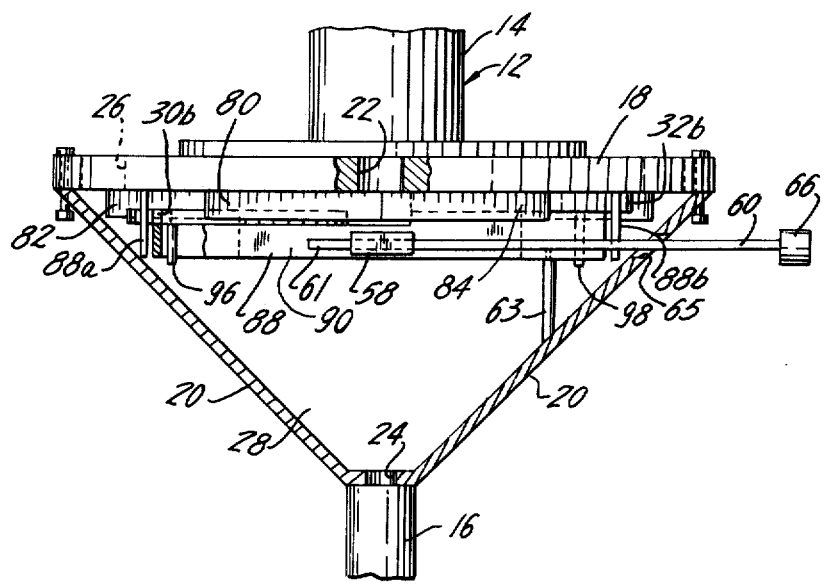
FIG. 6 is a side view of the valve shown in FIG. 6.

Referring now to FIGS. 5 and 6, there is shown still another embodiment of the multiple plate valve of the invention which is identified generally by the numeral 10''. The valve 10'' is mounted in a conduit 12 which includes conduit portions 14 and 16 as described above in conjunction with FIGS. 1 to 4. The valve 10'' includes outer cover plates 18 and 20, only cover plate 18 being shown in FIG. 5. Cover plate 18 includes aperture 22 which is in alignment with the interior of conduit 14 and cover plate 20 includes aperture 24 which is in alignment with aperture 22 in cover plate 18.

Disposed within the internal chamber 28 are closure members 30b and 32b which as illustrated take the form of a pair of circular disks or plates. The path of travel for the disks 30 and 32 within the cover plates 18 and 20 is defined by a first pair of upper and lower track members 80 and 82, respectively, which may take the form of a pair of ridges or grooves disposed in at least one of the cover plates 18 and 20; the track members 80 and 82 define a path of travel for the disk 30b toward or away from disk 32b and the aperture 22. In addition, upper and lower track members 84 and 86, respectively, which also may take the form of a pair of ridges or grooves disposed in at least one of the cover plates 18 or 20, define a path of travel for the disk 32b toward or away from the disk 30b and the aperture 22. In FIG. 6, only the upper track members 80 and 84 are shown for purposes of drawing clarity.

As will now be appreciated, the disks 30b and 32b adapted to be moved within the track members 80 and 82, and 84 and 86, respectively, into overlapping relationship with each other so as to close off the aperture 22 in the cover plate 18. In addition, disks 30b and 32b are adapted to move from such overlapping position away from each other between the abovementioned track members so as to clear the aperture 22 to open the valve 10''. In a preferred embodiment, the disks 30b and 32b will include slightly flattened peripheries 31a, 31b, respectively, which flatterned peripheries contact track member 82, 86 when the valve is in its open position. Thus, the flattened peripheries 31a, 31b facilitate movement of the disks toward each other.

The means employed for effecting movement of the disks 30b and 32b are shown in FIGS. 5 and 6 and include U-shaped member 88 (adapted to ride between guides or ridges 88a and 88b connected to cover plate 18) which includes horizontal leg 90 and vertical legs 92 and 94. The vertical legs 92, 94 include slots 92a, 94a which are adapted to engage pins 96 and 98 which are eccentrically mounted to portions of disks 30b and 32b which are disposed near the sides of the disks 30b, 32b, away from the aperture 22, as shown.

In order to close the aperture 22 to flow of materials therethrough, the U-shaped member 88 is moved downwardly towards the aperture 22 thereby causing disks 30b and 32b to move toward each other along the track members 80, 82, and 84, 86, and into overlapping position over the aperture 22. Such a downward force may be applied to the U-shaped member 88 through means similar to that employed in the embodiments shown in FIGS. 1 to 4, such as through elongated member 58 including opening 58a through which elongated member 60 passes. The member 60 is pivotally connected via rod 63 to the cover plate 20 and passes through opening 65 in the cover plate 20 and terminates in a handle portion 66 which is disposed externally of the cover plates 18, 20, as shown. A downward force is applied to the U-shaped member 88 by lifting handle portion 66 so that the end 61 pivots downwardly thereby causing member 60 and U-shaped member 88 to move downwardly causing the disks 30b and 32b to move downwardly into their closed position over the aperture 22 in cover plate 18. It will be apparent to one skilled in the art that the disks 30b and 32b can be moved into their open position by merely applying a downward force to the handle portion 66 of member 60.

As in the case of the valve embodiments 10 and 10' shown in the previous Figures, when the disks 30b and 32b begin to wear, the disks 30b and 32b can be moved into their closed position (that is overlapping position) by merely applying a larger upward force to the handle portion 66, greater than originally applied to move the disks into their closed position when such disks are in an unworn condition. In this manner, the disks 30b and 32b are made to move a greater distance downwardly alogn the aforementioned track members, so that unworn portions thereof will overlap to continue to close off the aperture 22.

It will also be appreciated that in the valve embodiments 10, 10' and 10'' shown in FIGS. 1 to 6, the elongated member 60 may extend completely across the cover plates 18 and 20 so that portions of the elongated member 60 extend externally with respect to the cover plate 20 on either side thereof. In such embodiment, the pivot 63 is no longer necessary and another slot 65 will be provided on the other side of the cover plate 20. The elongated member 60 would in such embodiment be adapted to be raised or lowered along such slots thereby raising or lowering the U-shaped member 44 or 88 which in turn causes corresponding movement of the disks 30 and 32 as desired.

Figure 7:
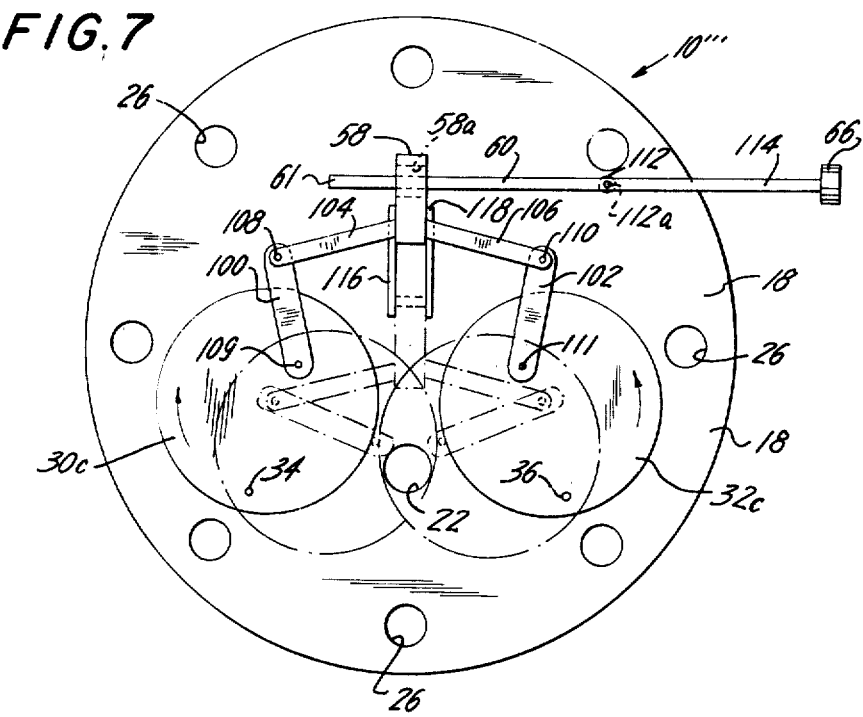
FIG. 7 is a view of another embodiment of the multiple plate valve of the invention wherein one of the outer cover members has been removed.
Figure 8:
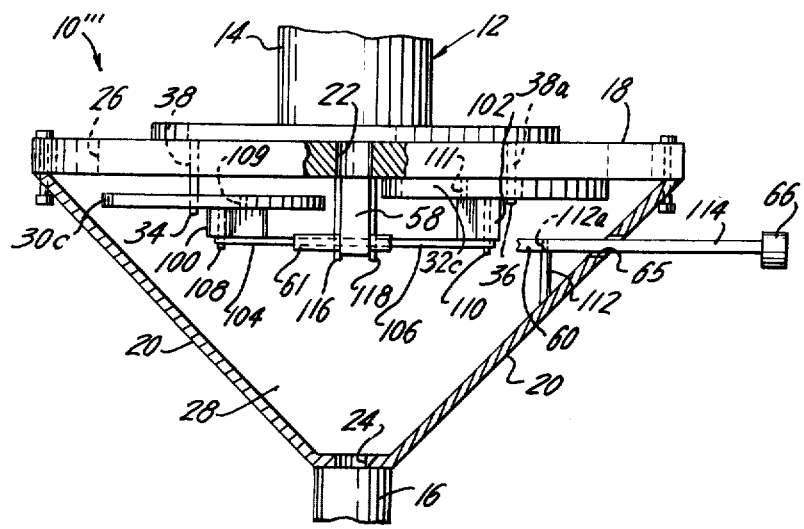
FIG. 8 is a side view of the valve shown in FIG. 8.

Referring now to FIGS. 7 and 8, there is shown yet another embodiment of a multiple plate valve in accordance with the present invention which is identified generally the numeral 10'''. The valve 10''' is mounted in conduit 12 as described hereinbefore with respect to the valve embodiments shown in FIGS. 1 to 6 and includes outer cover plates 18 and 20 which cover plates include aligned apertures 22 and 24, respectively.

Closure members in the form of disks 30c and 32c eccentrically and pivotally mounted on cover plate 18 by means of pivot mounting means 34 and 36, respectively, which, as shown, generally comprise shafts 38 and 38a, respectively, which pass through off-centered bores in the disks 30c and 32c, respectively. As in the case of the valve 10 embodiment shown in FIGS. 1 and 2, the disks 30c and 32c are adapted to be pivotally moved about shafts 38 and 38a, respectively, from the position shown in FIGS. 7 and 8 into overlapping relationship with each other so as to close off the aperture 22 in the cover plate 18. In addition, disks 30c and 32c are adapted to be moved from such overlapping position away from each other so as to clear the aperture 22. The means for effecting the movement of the disks 30c and 32c are shown in FIGS. 7 and 8 and include first and second leg portions 100, 102, one end portion of each being pivotally connected to cross members 104 and 106, by means of pivot pins 108 and 110, respectively. The other end portions of the first and second legs 100 and 102 are connected to pivot pins 109 and 111 which are eccentrically mounted on disks 30c and 32c respectively, as shown. The cross members 104 and 106 are connected to member 58 which in turn is connected to elongated member 60 which is pivotally mounted via pivot pin 112 to cover plate 20, as shown in FIG. 8. An end portion 114 of the member 60 extends externally to the cover plates and terminates in handle portion 66. Furthermore, guide means in the form of ridges 116 and 118 are connected to the cover plate 18 and provide a path of travel for the member 58 as it moves upwardly or downwardly.

When it is desired to move the disks 30c and 32c from their open, non-overlapping position to their overlapping position, the handle portion 66 is moved upwardly thereby causing the elongated member 60 to pivot about pivot 112a thereby causing member 58 to move downwardly which in turn causes cross members 104 and 106 to move downwardly thereby causing disks 30c and 32c to move downwardly and pivot on pivots 34, 36, respectively, and move into overlapping relationship with each other over the aperture 22. It will be apparent to one skilled in the art that the disks 30c and 32c can be moved into their open position by merely applying a downward force to the handle portion 66 of member 60. Again, as in the case of the previous valve embodiments, when the disks 30c and 32c begin to wear, unworn portions of the such disks may be oved into overlapping relationship with each other by merely applying a greater upward force on the handle 66 which causes the disks 30c and 32c to move toward the aperture 22 so that fresh unworn portions of such disks are maintained in overlapping relationship with each other.

Referring now to FIGS. 9, 10, 10A and 10B, there is shown another embodiment of the multiple plate valve of the invention which is identified generally by the numeral 10$^{IV}$ which includes outer cover members or plates 18 and 20, cover plate 18 including aperture 22 which is in alignment with the interior of conduit 14 and cover plate 20 including aperture 24 which is in alignment with aperture 22.

Figure 9:
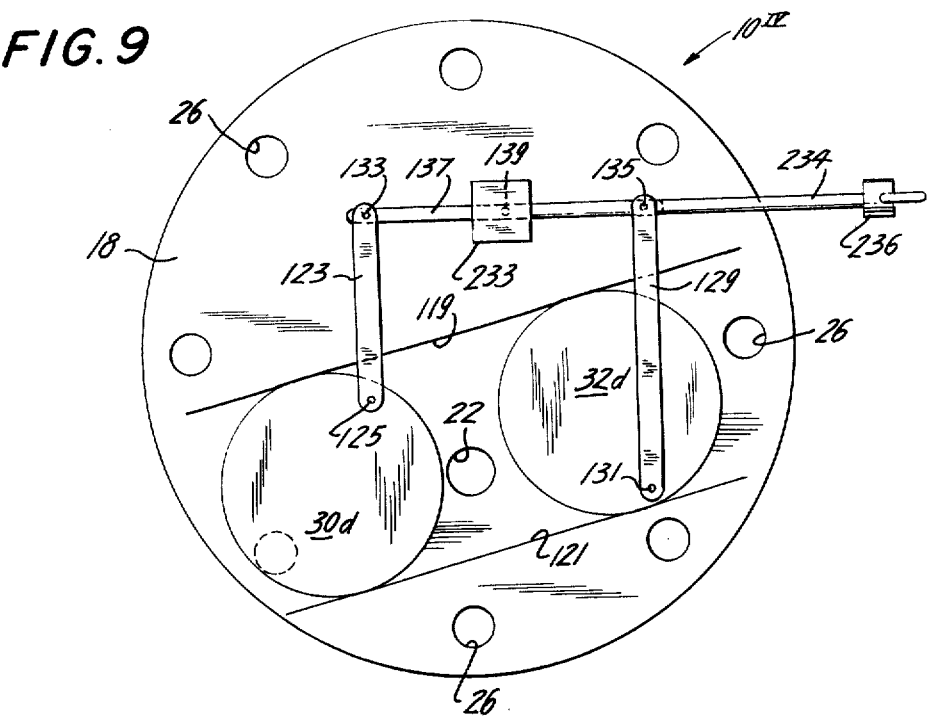
FIG. 9 is a view of yet another embodiment of the multiple plate valve of the invention wherein one of the outer cover members thereof has been removed.

Disposed within internal chamber 28 are closure members 30d and 32d which are adapted to be held between the cover plates 18 and 20 in a manner such that they can be moved into overlapping relationship with each other over the aperture 22 so as to close off the same. The plates 30d and 32d are adapted to move toward or away from each other between and along the upper track member 119 and the lower track member 121, as shown. The upper and lower track members 119 and 121 comprise ridges or grooves disposed in the cover plate 18, which ridges or grooves define a substantially straight path angled downwardly, preferably at an angle to the horizontal of within the range of from about 10° to about 40° and preferably within the range of from about 15° to about 30°. The means employed for effecting movement of the plates 30d and 32d comprise a first leg member 123 which is pivotally mounted to an off-centered portion of the plate 30d by means of pivot mounting means 125 which takes the form of shaft 127. A second leg 129 is pivotally connected to the plate 32d an off-centered portion, as shown, by means of pivot mounting means 131 which includes shaft 131a. The other ends of the first and second leg portions 123, 129, respectively, are pivotally connected by means of pivot pins 133, 135 to cross member 137, as shown in FIG. 9. In a preferred embodiment, the leg member 123 will be slightly biased toward opening 22, while the leg member 129 will be slightly biased away from opening 22, as shown.

Figure 10:
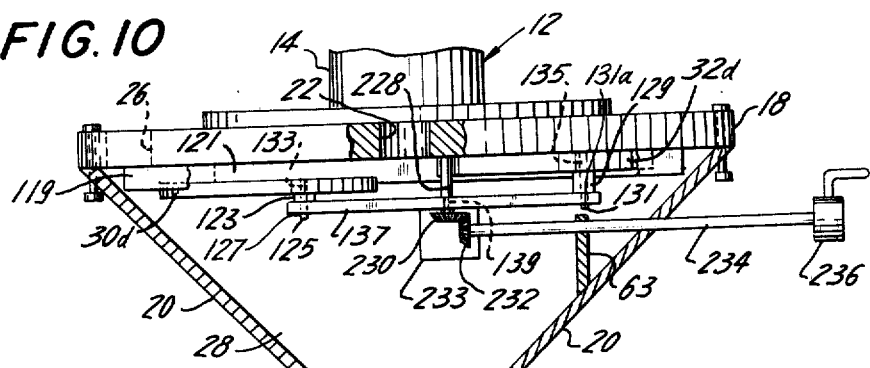
FIG. 10 is a side view of the valve shown in FIG. 9.
Figure 10A:
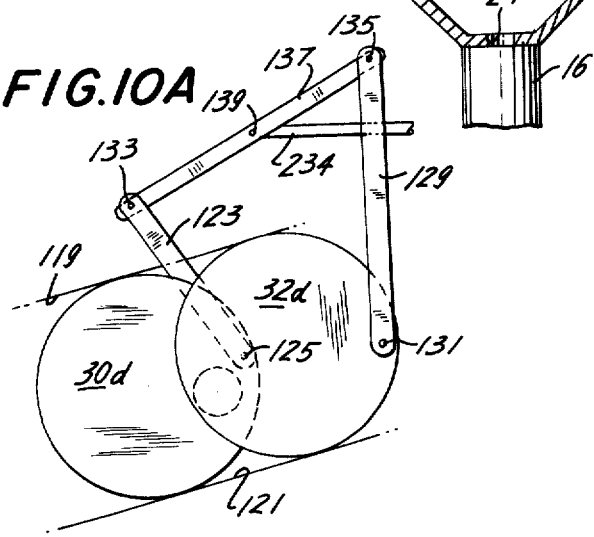
FIG. 10A is a view of a portion of the valve shown in FIG. 9 in its closed position.
Figure 10B:
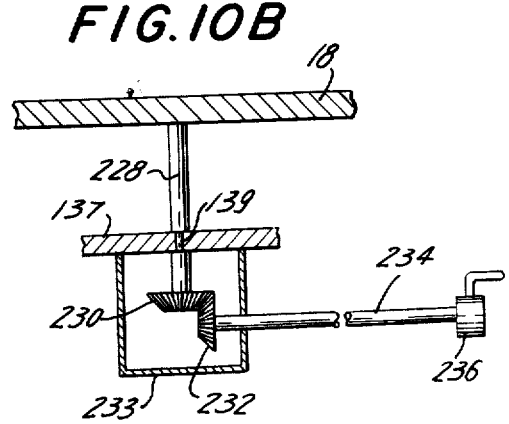
FIG. 10B is a view of a portion of the valve shown in FIG. 10.
Figure 11:
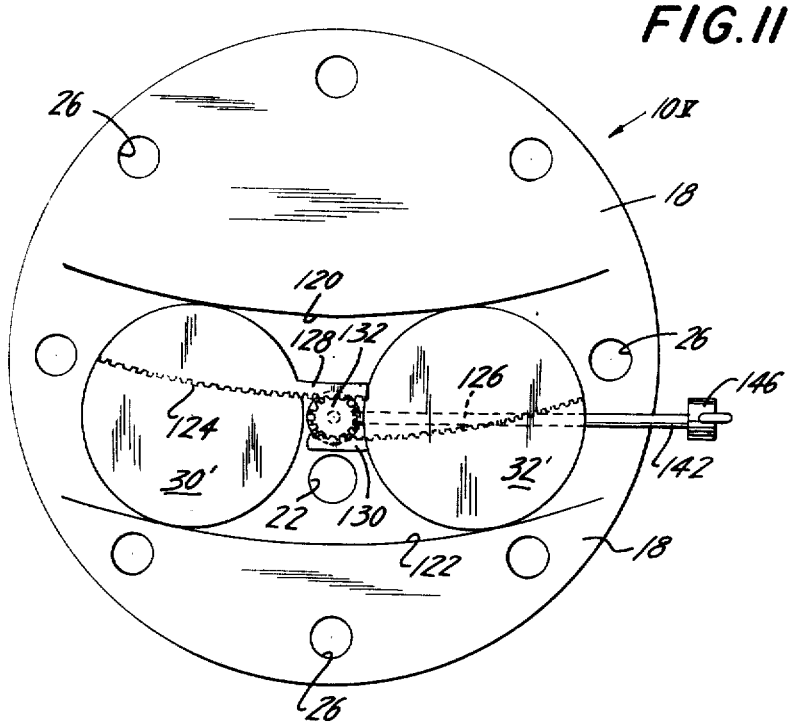
FIG. 11 is a view of an additional embodiment of the multiple plate valve of the invention wherein one of the outer cover members has been removed.

It will now be appreciated that the plates 30d and 32d are adapted to be moved between and along the track members 119 and 121 into overlapping relationship with each other so as to close off the aperture 22 in the cover plate 18. This is accomplished by rotating or pivoting the cross member 137 at pivot 139, as shown in FIG. 9 and FIG. 10A so that the second leg portion 129 pivots toward the aperture 22 and the first leg portion 123 pivots toward the aperture 22, which leg portions in turn carry the plates 30d and 32d into overlapping relationship over the aperture 22.

Pivoting of the cross member 137 about the pivot 139 is effected as follows. The cross member 137 is rotatably connected by means of shaft 228 to the cover plate 18 as shown. Thus, rotation of the shaft 228 will cause pivotal movement of the cross member 137 thereon, which, in turn, will cause the pivotal movement of the first and second leg portions 123, 129 and the plates 30d and 32d, respectively, as described above. The means employed for pivoting or rotating the shaft 228 comprises gear means 230 (best shown in FIG. 10B) disposed at the end of the shaft 228 away from cover plate 18 which is adapted to mesh with gear 232 disposed in gear holding box 233 and connected to rod 234 which terminates in handle 236; thus rotation of the handle 236 and shaft 234 will cause rotation of the gear 232 which in turn causes rotation of the gear 230 and shaft 228 thereby causing the cross member 137 to pivot or rotate clockwise or counter-clockwise depending upon the direction of rotation.

As in the case of the previous embodiments described above, as the plates 30d and 32d begin to wear as shown in FIG. 1A, the plates 30d and 32d may be moved into greater overlapping relationship with each other so that unworn portions of these plates can be employed in conjunction with each other to overlap and close off the aperture 22.

Referring now to FIGS. 11, 12, 13 and 13A, there is shown yet another embodiment of the multiple plate valve of the invention which is identified generally by the numeral 10$^V$ which includes outer cover members or plates 18 and 20. As in the previous embodiment, cover plate 18 includes aperture 22 which is in alignment with the interior of conduit 14 and cover plate 20 includes aperture 24 which is in alignment with aperture 22.

Disposed within internal chamber 28 are closure members 30' and 32' which are adapted to be held between the cover plates 18 and 20 in a manner such that they can be moved into overlapping relationship with each other over the aperture 22 in the cover plate 18 so as to close off such aperture. The plates 30' and 32' are adapted to move toward or away from each other between and along the upper track member 120 and the lower track member 122, as shown. The upper and lower track members comprise ridges or grooves disposed in the cover plate 18, which ridges or grooves define an arcuate or curved path. The means employed for effecting movement of the plates 30' and 32' comprise gear teeth 124 disposed on plage 30' which gear teeth extend from end to end of the plate 30' and extend beyond the plate 30' along extension 128; gear teeth 126 of plate 32' extend from end to end thereof and extend beyond the plate 32' along the extension 130. The gear teeth 124 and 126 of plates 30' and 32', respectively, which define a slightly arcuate or curved path corresponding to the upper and lower track members 120, 122, are adapted to engage the gear 132, as shown, so that the plates 30' and 32' can be made to move along the gear 132 toward or away from each other depending upon the direction of rotation of the gear 132. Thus, where it is required to open the valve 10$_V$, the gear 132 can be rotated in a first desired direction thereby causing the plates 30' and 32' to ride along the gear 132 and move in opposite directions away from each other so as to open the valve. However, where it is desired to close the valve, the gear 132 can be made to rotate in the opposite direction thereby causing movement of the plates 30' and 32' toward each other until they overlap and close off the aperture 22 in the cover plate 18 and thereby close the valve 10$^V$.

Figure 13:
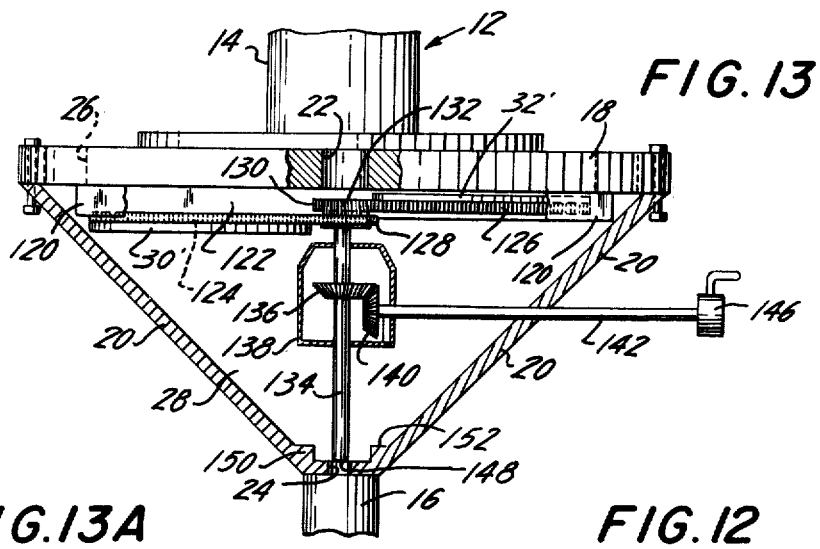
FIG. 13 is a side view of the valve shown in FIG. 11.
Figure 13A:
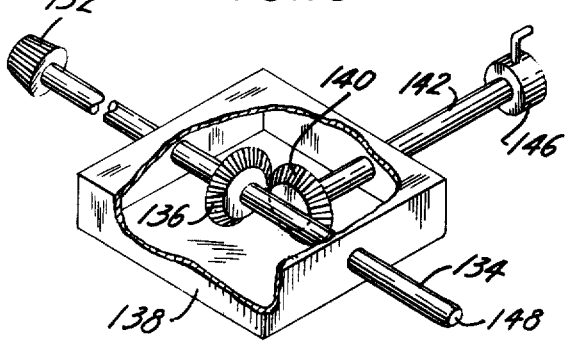
FIG. 13A is a fragmentary view of a portion of the valve shown in FIG. 13.

Rotation of the gear 132 can be effected by means of shaft 134 which is connected to gear 132 and preferably extends from the gear 132 to cover plate 20, as shown. Rotation of the shaft 134 can be effected from outside of the valve 10$^V$ as follows. In a preferred embodiment of the invention, the shaft 134 includes a gear 136 disposed in gear holding box 138. The gear 136 meshes with gear 140 (best shown in FIG. 13A), gear 140 being connected to rod 142 which extends through a slot 144 in the cover plate 20 and terminates in handle portion 146, as shown in FIGS. 13 and 13A. Rotation of handle 146 and rod 142 causes rotation of the gear 140 which in turn causes rotation of the gear 136, shaft 134 and gear 130, which in turn causes movement of the plates 30' and 32'.

Figure 12:
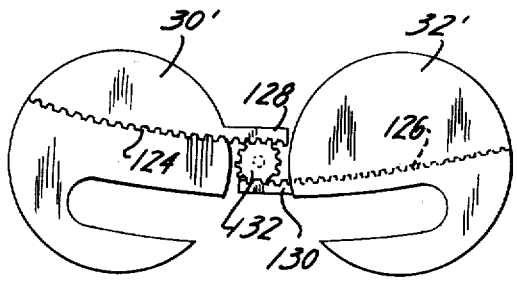
FIG. 12 is a view of the closure members employed in the valve shown in FIG. 11, which closure members are in a partially worn condition.

As in the case of the previous embodiments described above, as the plates 30' and 32' begin to wear as shown in FIG. 12, the plates 30' and 32' may be moved into greater overlapping relation with each other so that unworn portions of these plates can be employed in conjunction with each other to overlap and close off the aperture 22.

In the event that one plate, for example, plate 30', wears more than the other plate 32', then, in such case, the position of the plates 30' and 32' may be adjusted from side to side in one coarse adjustment by merely pulling handle 146 and rod 142 outwardly away from the cover plate 20 thereby causing the plates 30' and 32' to move to the right as shown in FIG. 13. In this way, the plate 30' will be moved closer to the aperture 22 so that unworn portions thereof may be employed in conjunction with unworn portions of the plate 32' to close off the aperture 22, as described above. Alternatively, the handle 146 and rod 142 connected thereto may be pushed toward the cover plate 20 thereby causing the plates 30' and 32' to move to the left as shown in FIG. 13 so that the cover plate 32 will be disposed closer to the aperture 22 and unworn portions of the cover plate 32' can be employed in conjunction with unworn portions of plate 30' to close off the aperture 22 as described above. During the left to right or vice versa movement of the plates 30' and 32' by means of the coarse adjustment described above, the end portion 148 of the rod 134 will move but remain between shoulders 150 and 152 disposed on the cover plate 20, as shown, so that the position of the plates 30' and 32' and the gear 132 during the coarse adjustment described above is easily controlled. Furthermore, the gear 132 will preferably be beveled as shown in FIG. 13A so that during the side-to-side coarse adjustment, it will remain in contact with the gear teeth 124, 126 of the plates 30' and 32'.

Figure 14:
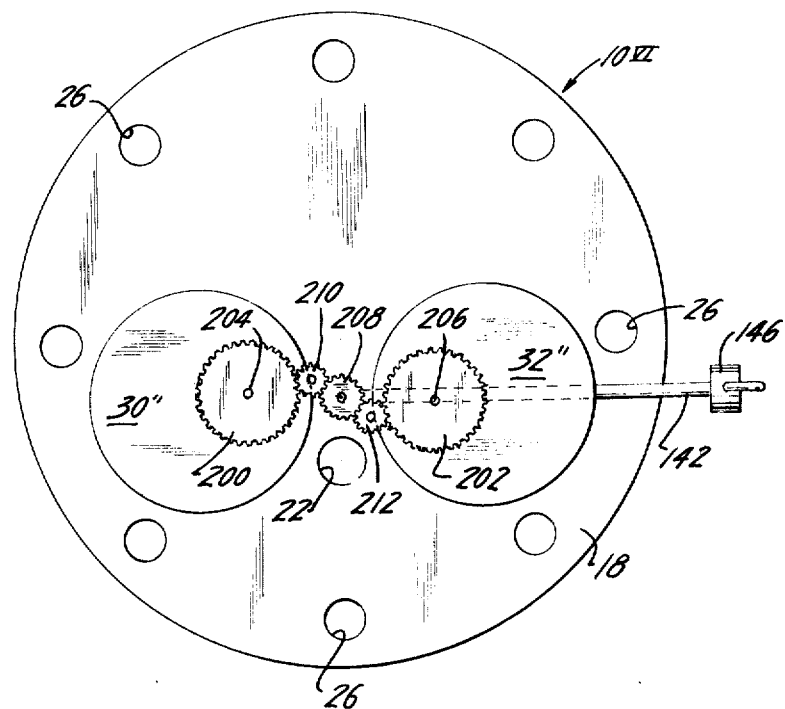
FIG. 14 is a view of still another embodiment of the multiple plate valve of the invention wherein one of the outer cover members has been removed.
Figure 15:
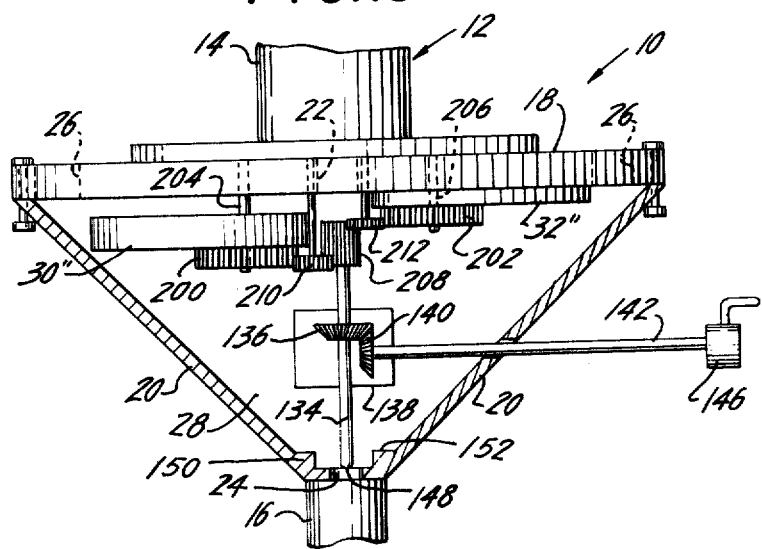
FIG. 15 is a side view of the valve shown in FIG. 14.

Referring now to FIGS. 14 and 15, there is illustrated another embodiment of the multiple plate valve in accordance with the present invention identified generally by the numeral $10^{VI}$. As in the case of the previous valve embodiments described above, the valve $10^{VI}$ is adapted to be mounted in a conduit 12, which conduit 12 includes portions 14 and 16 as shown in FIG. 15. The valve $10^{VI}$ includes outer cover plates 18 and 20, cover plate 18 including an aperture 22 and cover plate 20 including an aperture 24, which apertures are in alignment with each other. Closure members in the form of circular disks 30'' and 32'' are disposed in the internal chamber 28. The valve $10^{VI}$ includes means associated with each of the disks 30'' and 32'' for defining a path of travel for such disks toward or away from each other, which means comprises plate gears 200 and 202 eccentrically mounted on the plates 30'' and 32'', respectively, by means of pivot pins 204 and 206, respectively, which pivot pins also connect plates 30'' and 32'' to the cover plate 18 as shown. Main drive gear 208 engages auxiliary gears 210 and 212 which are rotatably mounted via shafts 209 and 211, respectively, to cover plate 18, as shown; the auxiliary gears 210 and 212 engages the plate gears 200 and 202, respectively. Thus, where it is required to open the valve $10^{VI}$, the main drive gear 208 can be rotated in a first desired direction thereby causing the auxiliary gears 210, 212 to rotate which in turn causes rotation of the plate gears 200 and 202 thereby causing plates 30'' and 32'' to move away from each other so as to open the valve. However, where it is desired to close the valve, the main drive gear 208 can be made to rotate in the opposite direction thereby causing opposite rotation of the auxiliary gears 210 and 212 and opposite rotation of the plate gears 200 and 202. The result is that the plates 30'' and 32'' are made to move toward each other into overlapping relationship and close off the aperture 22 in the cover plate 18 and thereby close the valve.

Rotation of the main drive gear 208 can be effected in the manner similar to that shown in FIGS. 13 and 13A wherein shaft 134 includes gear means 136 which engages the gear means 140 connected to rod 142. Rotation of the rod 142 causes rotation of the gear 140 which in turn causes rotation of the gear 136 thereby causing rotation of the shaft 134 and the main drive gear 208.

As in the case of the previously described valve embodiments of the invention, as the plates 30'' and 32'' begin to wear, the plates 30'' and 32'' may be moved into greater overlapping relationship with each other, so that unworn portions of these plates can be employed in conjunction with each other to overlap and close off the aperture 22.

Figure 16:
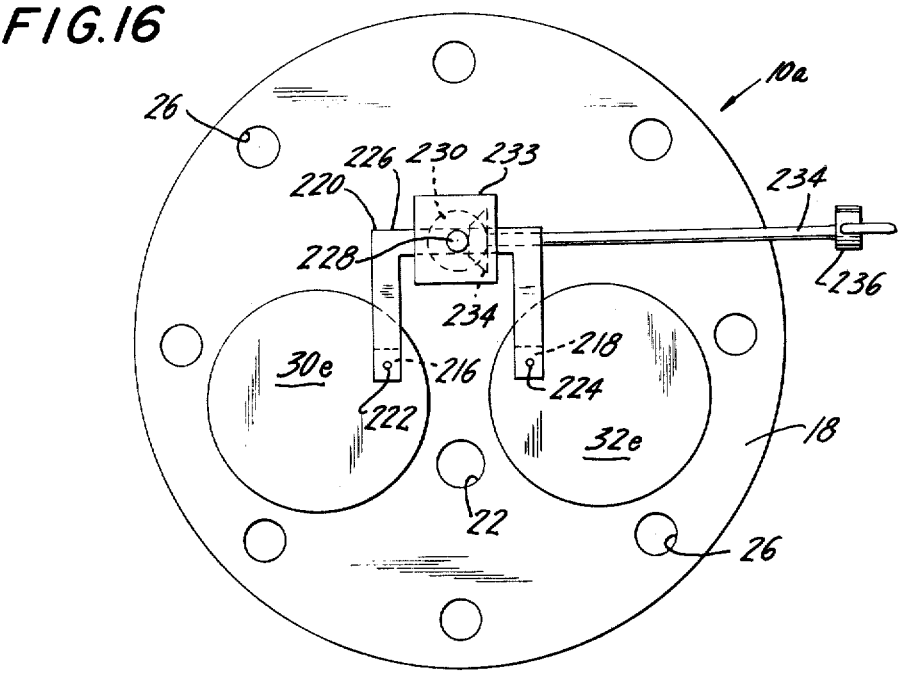
FIG. 16 is a view of another embodiment of the valve in accordance with the present invention wherein one of the outer cover members has been removed.
Figure 17:
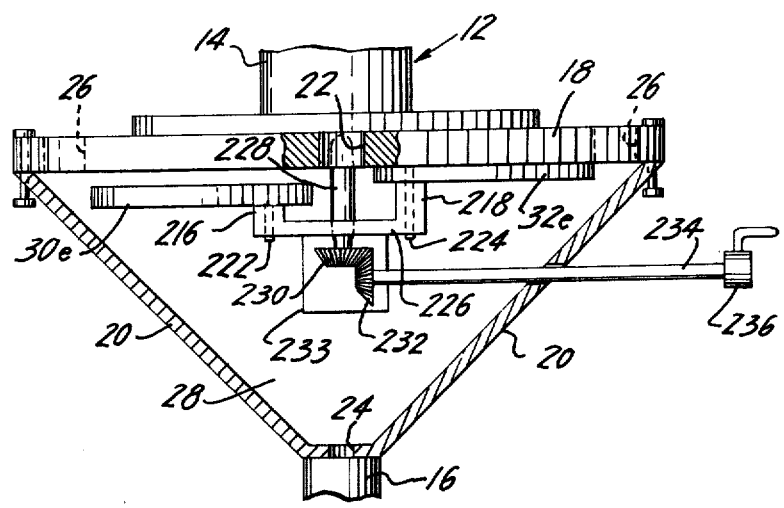
FIG. 17 is a side view of the valve shown in FIG. 16.

Referring now to FIGS. 16 and 17 there is illustrated another embodiment of a valve in accordance with the present invention which is identified generally by the numeral 10a. As in the previous valve embodiments discussed above, the valve 10a is adapted to be mounted in a conduit 12, which conduit includes portions 14 and 16, shown in FIG. 17. The valve 10a includes cover plates 18 and 20, cover plate 18 including aperture 22 and cover plate 20 including aperture 24, which apertures are in alignment with each other.

The valve 10a shown in FIGS. 16 and 17 basically differs from the valves shown in the Figures described above in that valve 10a includes closure members 30e and 32e only one of which closure members functions to close off the aperture 22 at a given point in time, whereas in the previous valve embodiment, two closure members function in conjunction with one another to present overlapping portions of such closure members to close off the aperture 22.

The closure members 30e and 32e are disposed in internal chamber 28 of the valve 10a and are connected to vertical legs 216, 218 of U-shaped member 220 by means of pins 222 and 224, respectively. The horizontal leg 226 of the U-shaped member 220 is rotatably connected by means of shaft 228 to the cover plate 18 as shown. It will now be appreciated that rotation of the U-shaped member 220 about the shaft 228 will cause either plate 30e or plate 32e to move over the aperture 22 to close off the valve 10a or away from the aperture 22 to open the valve 10a.

The means employed for rotating the U-shaped member 220 comprises gear means 230 (best shown in FIG. 17) disposed at the end of the shaft 228 away from the cover plate 18 which is adapted to mesh with gear 232 disposed in holding box 233 and connected to rod 234 which terminates in handle 236. Thus, rotation of the handle 236 and shaft 234 will cause rotation of the gear 232 which in turn causes rotation of the gear 230 and shaft 228 thereby causing the U-shaped member 220 to rotate clockwise or counter-clockwise depending upon the direction of rotation. In this manner, one of the plates 30e and 32e may be moved over the aperture 22 to close off the same while the other plate is moved away from such aperture. When it is desired to open the valve 10a and aperture 22, the handle 236 and shaft 234 are rotated in the opposite direction thereby causing the plates 30d and 32d to move to the position shown in FIG. 16.

It will be appreciated that with the embodiment shown in FIGS. 16 and 17, only one of the plates 30e and 32e is used at any one time to close off the aperture 22 in the cover plate 18. Thus, when one of the plates 30e and 32e begins to wear, as shown, for example in FIG. 1A, then such plate may be moved so that unworn portions thereof continue to close off the aperture 22. However, when such plate has completely worn so that it is no longer of use, the other plate may be employed to close off the aperture 22, as described above.

Figures 18, 19:
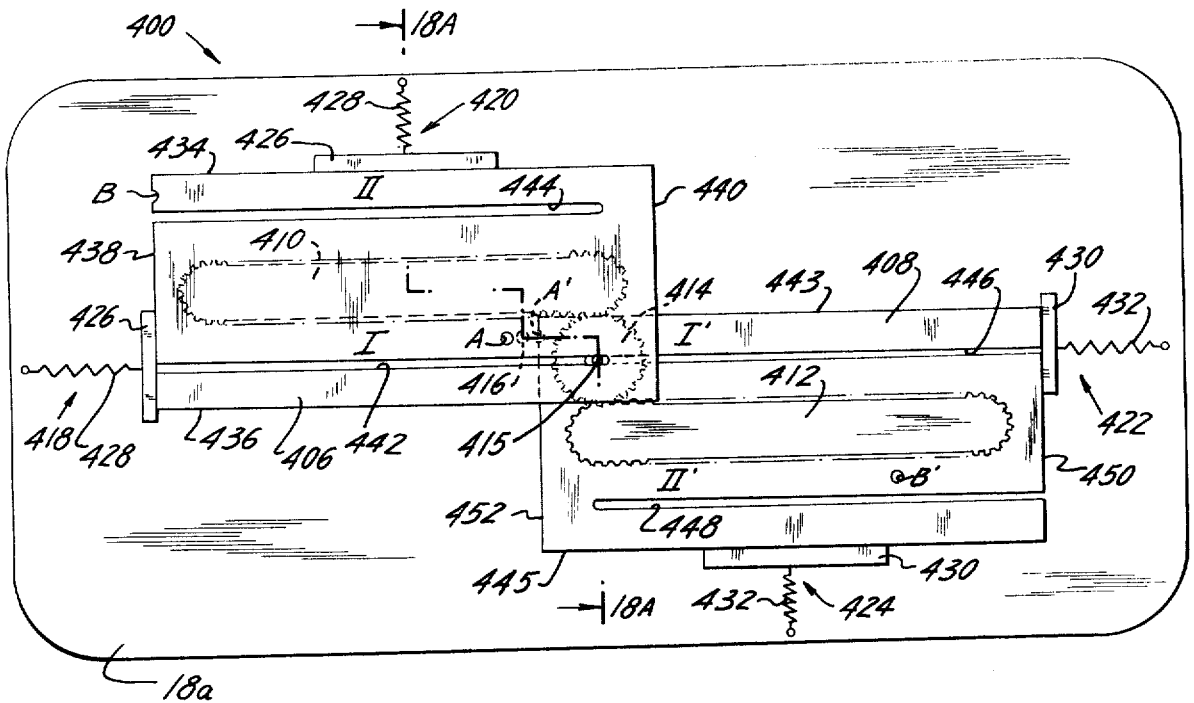
FIG. 18 is a view of yet another embodiment of the multiple plate valve of the invention wherein one of the outer cover members has been removed.
FIG. 19 is a view of the valve shown in FIG. 18 wherein one working portion of each of the closure members is worn.

Referring now to FIGS. 18, 18A, 19 and 20, there is shown another embodiment of the multiple plate valve of the present invention wherein the numeral 400 generally designates such valve. As shown, the valve 400 includes a cover plate 18a and a cover plate 20a, (the latter cover plate being shown only in FIG. 18A) which cover plates are held together by means of conventional connecting means such as bolts 402 and 404 as shown in FIG. 18A. The closure members employed in the valve 400 comprises plates 406 and 408 (disposed between cover plates 18a, 20a) which include gear 410 and gear 412, respectively, such gears being fixedly mounted to each of the plates 406 and 408 by conventional means, such as screws or bolts (not shown for purposes of drawing clarity). The gear teeth of each of the gears 410 and 412 are adapted to engage main gear 414 which is fixedly mounted to shaft 415, the ends of shaft 415 extending through and externally of cover plates 18a, 20a as shown in FIG. 18A. It will thus be appreciated that rotation of gear 414, as described below, allows movement of the closure members or plates 406 and 408 with respect to each other to open and close off the opening 416 in the cover plate 18a and the opening 416a in the cover plate 20a.

The closure members or plates 406, 408, are designed so that they each include two elongated working areas, I, II and I', II', respectively. Thus, when one working area of each of the plates 406, 408 wear out, (for example areas I, I'), the plates 406, 408 are designed to be rotated about each other by means of gear 414 so that the other working areas of each of the plates 406, 608 (areas II, II') can be employed.

The closure members or plates 406 and 408 are maintained in constant contact with main gear 414 through the aid of one or more of the biasing members 418, 420 and 422, 424. The biasing members 418 and 420 each include a contact or base member 426 (adapted to bear against plate 406 or plate 408) connected to one end of a spring (or other bias means) 428, the other end of spring 428 being connected to a portion of cover plate 18a as shown in FIG. 18A; the biasing members 422 and 424 each include a contact or base member 430 (adapted to bear against plate 408 or plate 406) connected to one end of a spring (or other bias means) 432, the other end of spring 432 being connected to a portion of cover plate 20a as shown in FIG. 18A.

As seen best in FIG. 19, the closure member or plate 406 is preferably of rectangular shape (but may be comprised of other shapes, such as circular shape as will be apparent to one skilled in the art) and includes the elongated gear 410 disposed intermediate and preferably substantially equidistant between the sides 434, 436 and ends 438, 440 thereof. Disposed below gear 410 is a first elongated slot 442, which begins at end 438 and terminates short of end 440, and is adapted to engage shaft 415 of main gear 414 when the plate 406 is in the position shown in FIG. 18. A second elongated slot 444, which begins at end 438 and terminates short of end 440, is adapted to engage shaft 415 of main gear 414 when the plate 406 is in the position shown in FIG. 20.

Closure member or plate 408 includes elongated gear 412 intermediate and preferably substantially equidistant between the sides 443 and 445 thereof and further includes similar first and second elongated slots 446 and 448, respectively, disposed above and below the elongated gear 412 and beginning at end 450 and stopping short of end 452. The elongated slot 446 is adapted to engage shaft 415 of main gear 414 when plate 408 is in the position shown in FIG. 18, while the elongated slot 448 is adapted to engage shaft 415 of main gear 414 when plate 408 is in the position shown in FIG. 20.

As shown in FIG. 18, closure member or plate 406 includes an opening A disposed between elongated gear 410 and elongated slot 442, (in working area I) which opening may be moved into and out of alignment with the openings 416 and 416a in cover plates 18a and 20a, respectively, by movement of plate 406 toward or away from main gear 414. Furthermore, closure member or plate 408 includes a notched portion A' (in a portion of working area I') disposed at end 452 thereof which notched portion is adapted to be moved into and out of alignment with openings 416 and 416a of cover plates 18a and 20a, respectively, by movement of plate 408. Thus, plate 408 with notch portion A' works in conjunction with plate 406 and opening A thereof to open or continue to close off the openings 416 and 416a, even after such plates begin to wear about the opening A and notched portion A'.

In operation, the valve 400 may be moved from its open position into its closed position by merely rotating shaft 415 and thus rotating main gear 414 to cause the plates 406 and 408 to be moved toward each other into overlapping position so that the opening A and notch portion A' are out of alignment with openings 416 and 416a of cover plates 18a and 20a, respectively. After the plates 406 and 408 are repeatedly moved between open and closed positions, abrasive or corrosive materials passing through the opening A and notch portion A' will cause the working areas I and I' of plates 406 and 408 to wear about such portions. Thus, after such wear, in order to be able to continue to close the valve 400, it will be necessary to move to the plates 406, 408 into increasing overlapping relation until the worn portions (Ax on plate 406 and A'x on plate 408) become so large that the plates eventually pass out of overlapping relation with each other as shown in FIG. 19. When this occurs, continued rotation of main gear 414 will cause the plates 406 and 408 to move from the position shown in FIG. 19 into the position shown in FIG. 20 so that new unworn working areas (II and II') will be disposed over the openings 416, 416a in the cover plates. Thus, in plate 408, the working area (II') below gear 412 which includes opening B' and in plate 406, the working area (II) above the gear 410 including notched portion B can now cooperate with each other to open or close off the openings 416, 416a. Again, as portions of the plates 406, 408 wear about opening B' and notch portion B, the plates 406, 408 may be moved via main gear 414 into greater overlapping relation with each other so that such plates may continue to open or to close off the valve.

The main gear 414 may be rotated from externally of the cover plates 18a and 20a by means of a conventional gear arrangement as described with respect to the valve embodiment shown in FIGS. 24 through 27. In such embodiment, the elongated slots 442 and 444 of plates 406 and the elongated slots 446 and 448 of plate 408 may be eliminated.

Figure 21:
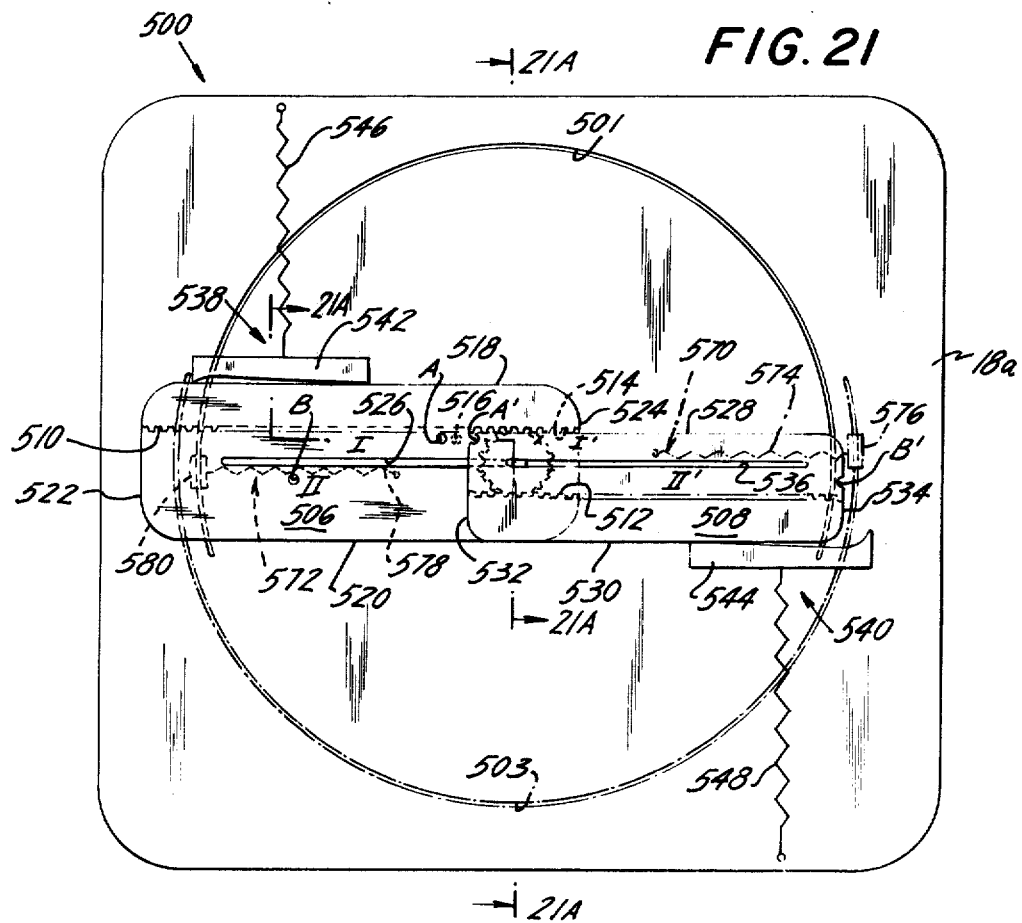
FIG. 21 is a view of still another embodiment of the multiple plate valve of the invention wherein one of the outer cover members has been removed.
Figure 22:
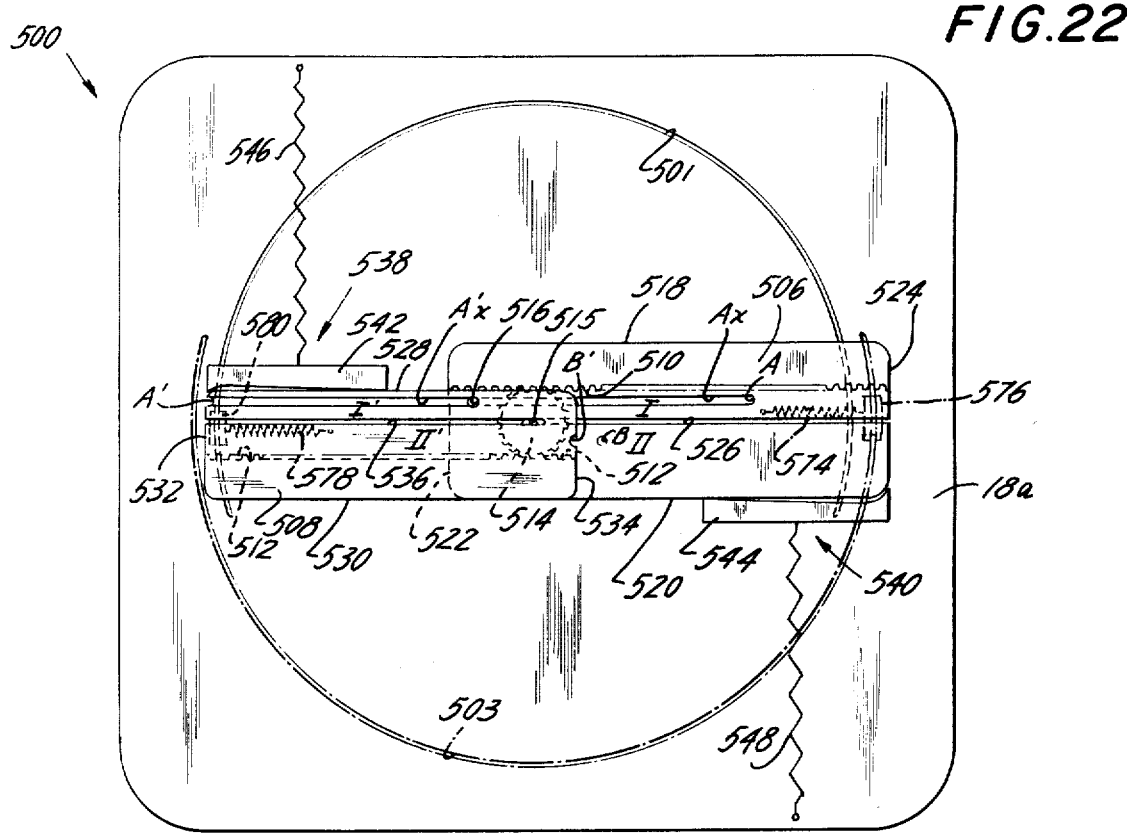
FIG. 22 is a view of the valve shown in FIG. 21 wherein one working area in each of the valve plates is worn.

Yet another embodiment of the multiple plate valve of the invention is shown in FIGS. 21, 21A, 22, 22 A and 23 which is identified generally by the numeral 500. As shown, the valve 500 includes a cover plate 18a having guide or ridge 501 on an inside surface thereof and a cover plate 20a (cover plate 20a being shown only in FIG. 21A) having guide or ridge 503 on an inside surface thereof, which plates are secured to each other by means of bolts or screws 502 and 504 as shown in FIG. 21A. Disposed between the cover plates 18a, 20a are closure members or plates 506 and 508 which include a row of gear teeth 510 and 512, respectively, fixedly mounted thereto by conventional securing means. The gear teeth 510, 512 are adapted to engage main gear 514 which is fixedly mounted to shaft 515 the ends of which extend through and externally of cover plates 18a, 20a as shown in FIG. 21A. It will now be appreciated that as with respect to valve embodiment 400, the rotation of main gear 514 as described below allows movement of the closure members or plates 506, 508 with respect to each other to open and close off the opening 516 in cover plate 18a and the opening 516a in cover plate 18a.

Figure 20:
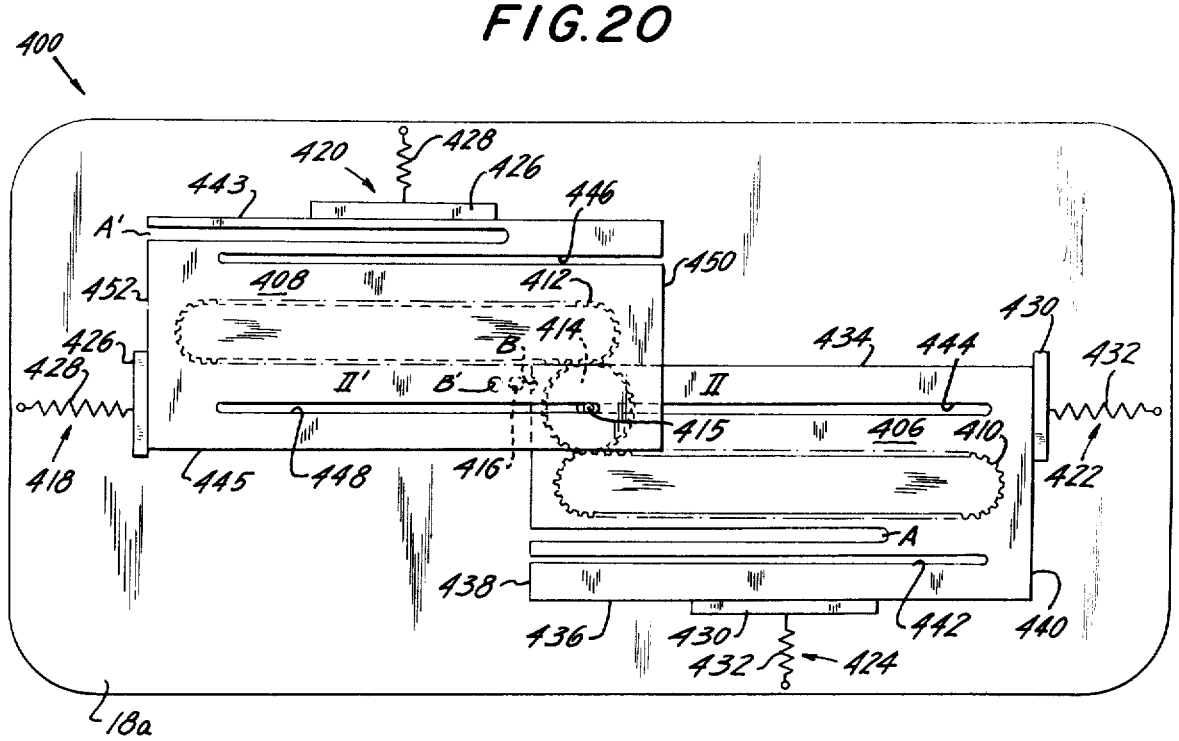
FIG. 20 is a view of the valve shown in FIG. 19 wherein a second pair of working areas of the closure members are employed in conjunction with each other to close off the valve.

As in the valve embodiment 400 of FIGS. 18 to 20, in the valve 500, the closure members or plates 506, 508 are designed so that they each include two elongated working areas I, II and I', II', respectively. Thus, as will be described in detail hereinafter, when one working area of each of the plates 506, 508 wear out (for example areas I and I'), the plates 506, 508 are designed to be rotated as a unit by means of gear 514 and with the assistance of guides or ridges 501 and 503 in cover plates 18a and 20a, respectively.

As shown in FIG. 21, the closure member or plate 506 is preferably larger than closure member or plate 508 and (the plate 506) includes the row of gear teeth 510 intermediate the sides 518, 520 thereof and extending from end 522 to end 524 thereof. An elongated slot 526 begins at end 524 and extends along the plate 506 terminating short of the end 522 and engages shaft 515 of gear 514. The first working area I of plate 506 is partially defined by opening A therein and extends from opening A between the row of gear teeth 510 and the elongated slot 526, while the second working area II thereof is partially defined by opening B and extends below and along the elongated slot 526 as shown in FIG. 21.

The closure member or plate 508 includes the row of gear teeth 512 extending between sides 528, 530 and from ends 532 to end 534 thereof. Disposed between side 528 and the row of gear teeth 512 is elongated slot 536 which extends from end 532 along the plate 508 and terminates short of end 534 thereof. As seen in FIG. 21, the first working area I' of plate 508 begins at notched portion A' in end 532 and extends between and along side 528 and elongated slot 536, while the second working area II' begins at notched portion B' and extends along and between gear teeth 512 and elongated slot 536. Thus, it will now be appreciated that when the plates 506, 508 are disposed so that the gear teeth 510, 512 thereof engage main gear 514 the shaft 515 extends through the elongated slots 526, 536 and through the cover plates 18a, 20a so that the shaft 515 may be rotated externally of such cover plates, while rotation of gear 514 will cause the plates 506, 508 to move towards or away from each other so that the working areas I, I' move into overlapping or non-overlapping relation to open or close off the openings 516, 516a of cover plates 18a, 20a depending on the direction of rotation.

The gear teeth 510, 512 of plates 506, 508, respectively, are maintained in constant contact with main gear 514 through the use of biasing members 538, 540 and biasing members 570, 572. The biasing members 538, 540 each include a contact or base member 542, 544, respectively, connected to one end of a spring (or other bias means) 546, 548, respectively. The other end of spring 546 is connected to a portion of cover plate 18a, while the other end of spring 548 is connected to a portion of cover plate 20a. The biasing member 570 comprises a spring 574 one end of which is connected to a portion of plate 506 and the other end of which is connected to carriage 576 which is engaged in and adapted to ride on and along ridge or groove 503. The biasing member 572 comprises a spring 578 one end of which is connected to a portion of plate 508 and the other end of which is connected to carriage 580 which is engaged in and adapted to ride on and along ridge or groove 501.

Figure 23:
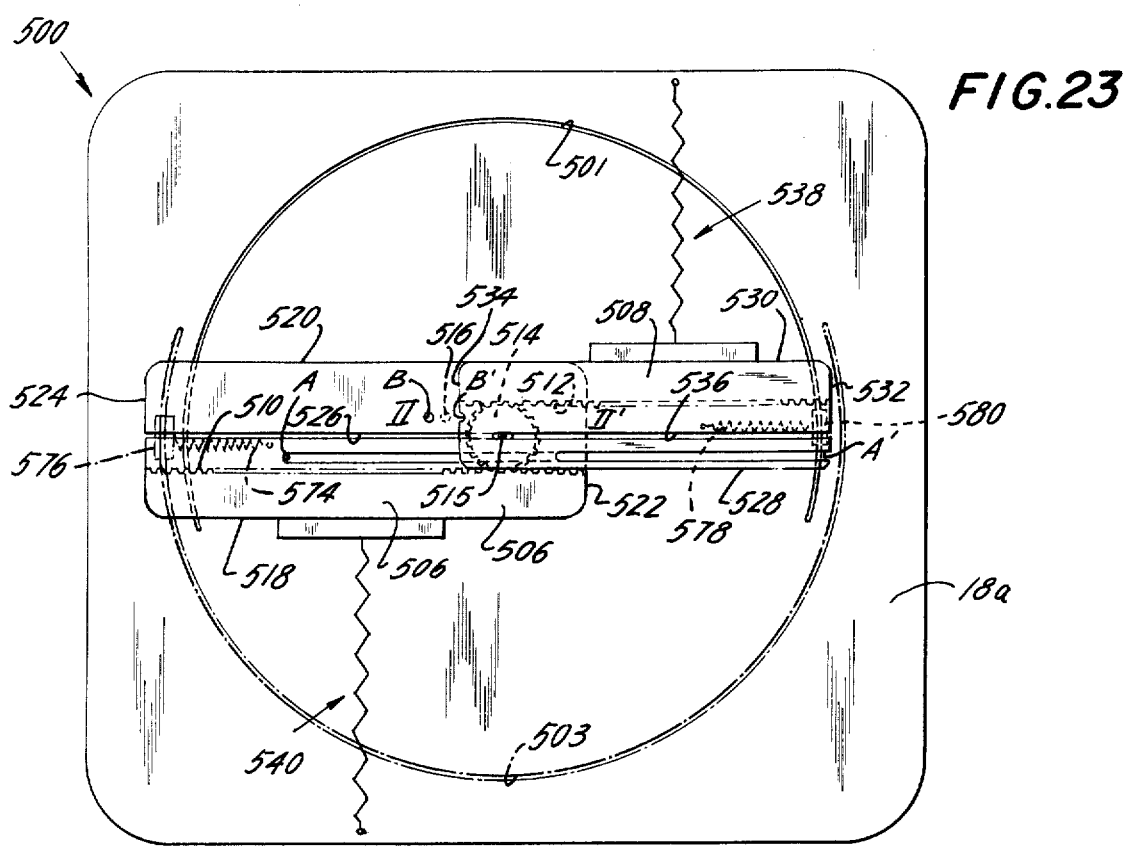
FIG. 23 is a view of the valve shown in FIG. 21 wherein a new set of working areas of the valve plates is employed in conjunction with one another to close off the valve.

In operation, the valve 500 may be moved from its open position into its closed position by merely rotating shaft 515 and thus rotating main gear 514 to cause the plates 506 and 508 to move towards each other into overlapping position so that opening A and notched portion A' are out of alignment with openings 516 and 516a of cover plates 18a and 20a, respectively. After the plates 506 and 508 are subjected to repeated movement between open and closed positions, abrasive or corrosive materials passing through the opening A and notched portion A' will cause the working areas I, I' of plates 506, 508, respectively, to wear about such portions to form worn portions Ax and A'x shown in FIG. 22. Thus, as in the case of the valve 400 of FIGS. 18–21, in order to continue to be able to close the valve 500, it will be necessary to move plates 506, 508 into increasing overlapping relation until the worn portions (Ax on plate 506 and A'x on plate 508) become so large that the plates eventually have to be moved to the positions shown in FIG. 22. As shown in FIG. 22, the working areas I and I' are now substantially worn. Accordingly, in order to reposition the plates 506, 508 so that the second working areas II and II' may be employed to close off the openings 516, 516a of valve 500, the main gear 514 is simply rotated clockwise thereby causing the plates 506, 508, which engage ridges or grooves 503, 501 via biased carriages 576 and 580, respectively, to rotate clockwise as a unit as shown by the phantom lines in FIG. 22A until they assume the position shown in FIG. 23. As shown in FIG. 23, the working areas II and II' of plates 506 and 508, respectively, are now in position to cooperate to open or close off the openings 516, 516a of valve 500.

Figure 22A:
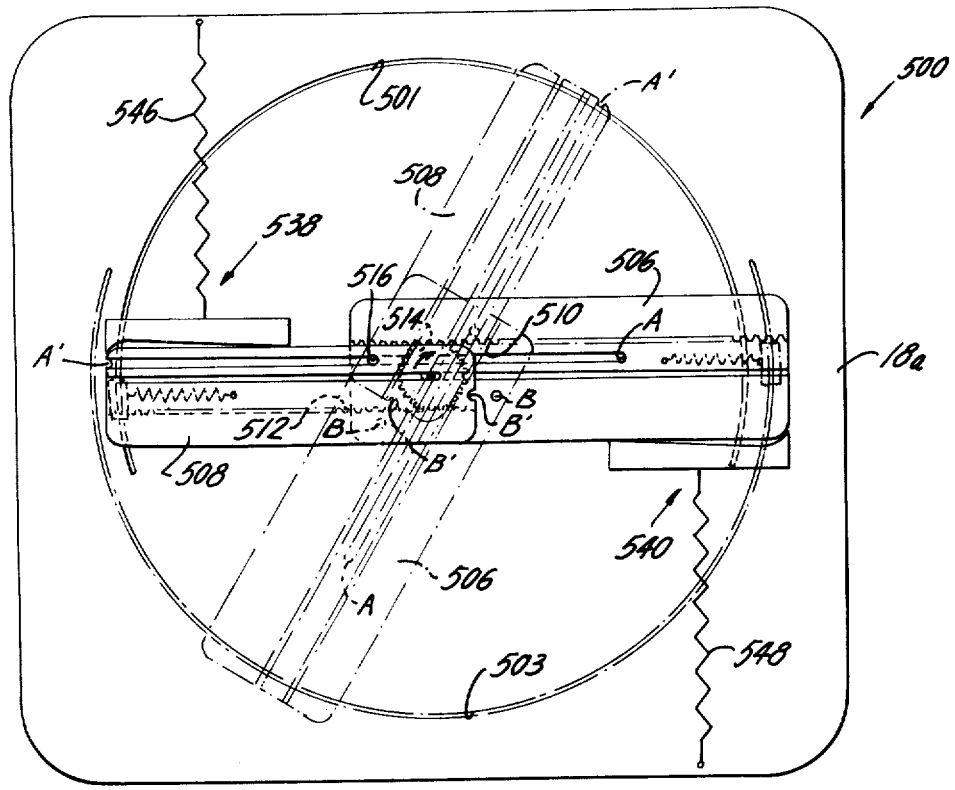
FIG. 22A is a view of the valve shown in FIG. 21 wherein as shown by the phantom lines, the valve plates are rotated as a unit until they assume the position shown in FIG. 23.

In order to ensure that the biasing members 538, 540 will not block the movement of plates 506, 508 as they are rotated as shown in FIG. 22A, the plates 506, 508 may be tapered from front to rear (in the manner of an airplane wing) and the ends of the base members 542, 544 disposed near the ridges or grooves 501, 503 may be connected via springs to the outer plates 18a and/or 20a. Thus, when the plates 506, 508 are rotated and contact the base members 542, 544 of the biasing means 538, 540, the base members 542, 544 will retract and move out of the path of the plates 506, 508 and the plates 506, 508 will slide by the same. When the plates 506, 508 have moved to a horizontal position, the base members 542, 544 will move (due to spring tension) to the position shown in FIG. 22.

If desired, when the plates 506, 508 have been rotated to assume the position shown in FIG. 23, biasing members 538, 540 may be repositioned as shown in FIG. 23 so that biasing member 538 now exerts pressure on side 530 of plate 508 and biasing member 540 exerts pressure on side 518 of plate 506 to ensure that the gear teeth of plates 506, 508 will remain in engagement with main gear 514. This can be easily accomplished by simply removing cover plates 18a and 20a and repositioning such biasing members.

It will also be appreciated that the main gear 514 may be rotated externally of the cover plates 18a, 20a by means of a conventional gear arrangement as described with respect to the valve embodiment shown in FIGS. 24 to 27. In such embodiment, the elongated slots 526, 536 may be eliminated.

Another embodiment of the multiple plate valve of the present invention is shown in FIGS. 24 to 27 wherein the numeral 600 generally designates such valve. As shown, a cover plate 18a includes ridge or guide 602, the purposes of which will become apparent later. The other cover plate 20a (shown in FIG. 27A only) which is connected to cover plate 18a by means of bolts or screws as described with respect to valves 400 and 500, includes ridge or groove indicated by phantom lines 604. The closure members employed in the embodiment of FIGS. 24 to 27 comprise plates 606 and 608 which include elongated gears 610 and 612, respectively, connected thereto by conventional securing means. The gear teeth of each of the gears 610, 612 are adapted to engage main gear 614 which allows movement of the closure members with respect to each other to open and close off the openings 616 and 616a in cover plates 18a, and 20a respectively, or the openings 617 and 617a in cover plates 18a and 20a, respectively in a manner as described hereinbefore with respect to FIGS. 18 to 23.

Figure 26:
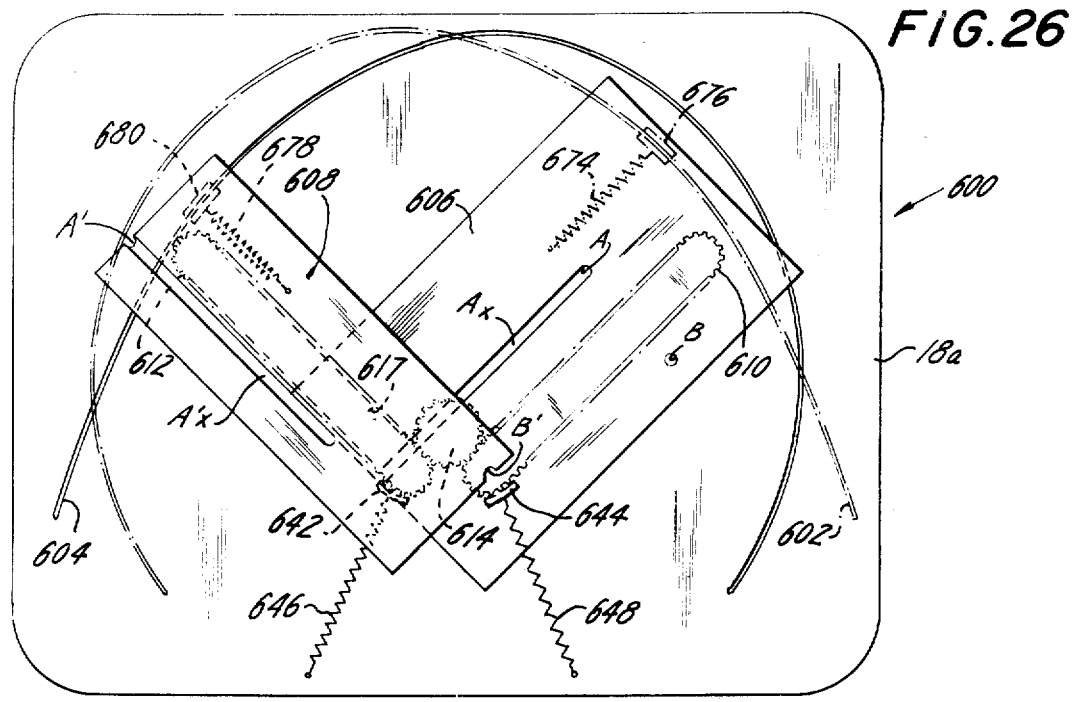
FIG. 26 is a view of the valve shown in FIG. 24 wherein the valve plates are moved in conjunction with one another so that a new set of working areas are employed to close off the valve.
Figure 27:
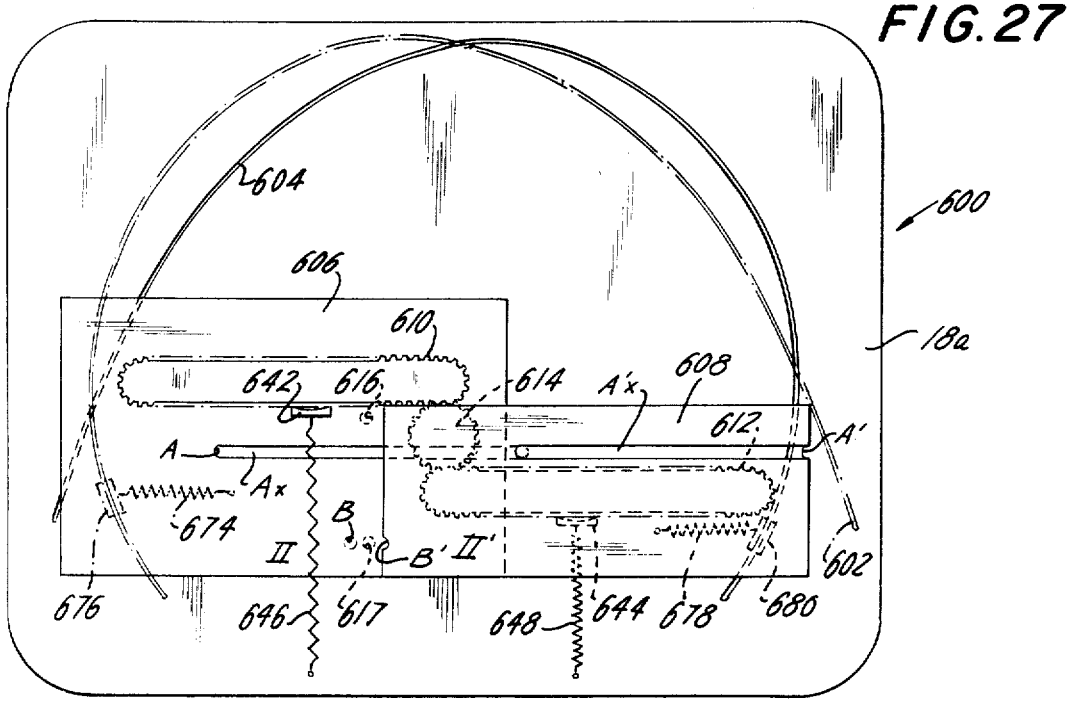
FIG. 27 is a view of the valve shown in FIG. 24 wherein the valve plates are now disposed so that the new working areas in each of the plates are employed in conjunction with one another to close off the valve.

The closure members 606 and 608 are designed so that they each include two elongated working areas, I, II, and I', II", respectively, Thus, when one working area of each of the closure members 606 and 608 wear out, (for example areas I and I' adapted to close openings 616, 616a) the closure members are designed to be moved about each other, as shown in FIGS. 26 and 27 and substantially turned around to reverse their positions so that the other working areas (II, II') of each of the closure members (areas II and II') can be employed to close off the openings 617, 617a during which time the openings 616, 616a will be kept closed as described hereinafter.

As will be apparent, the same main gear 614 is adapted to be employed for movement of the closure members 606 and 608 wherein the first working areas of each of said members are employed and also wherein the second working areas are employed that is after the first working areas are worn.

The elongated gears 610, 612 of closure members or plates 606, 608, respectively, are maintained in constant contact with main gear 614 through the use of biasing members 638, 640 and biasing members 670, 672. The biasing members 638, 640 each include a contact or base member 642, 644, respectively, connected to one end of a spring (or other bias means) 646, 648, respectively. The other end of spring 646 is connected to a portion of cover plate 18a, while the other end of spring 648 is connected to a portion of cover plate 20a.

The biasing member 670 comprises a spring 674 one end of which is connected to a portion of plate 606 and the other end of which is connected to carriage 676 which is engaged in and adapted to ride on and along ridge or groove 602. The biasing member 672 comprises a spring 678 one end of which is connected to a portion of plate 608 and the other end of which is connected to carriage 680 which is engaged in and adapted to ride on and along ridge or groove 604.

Figure 24:
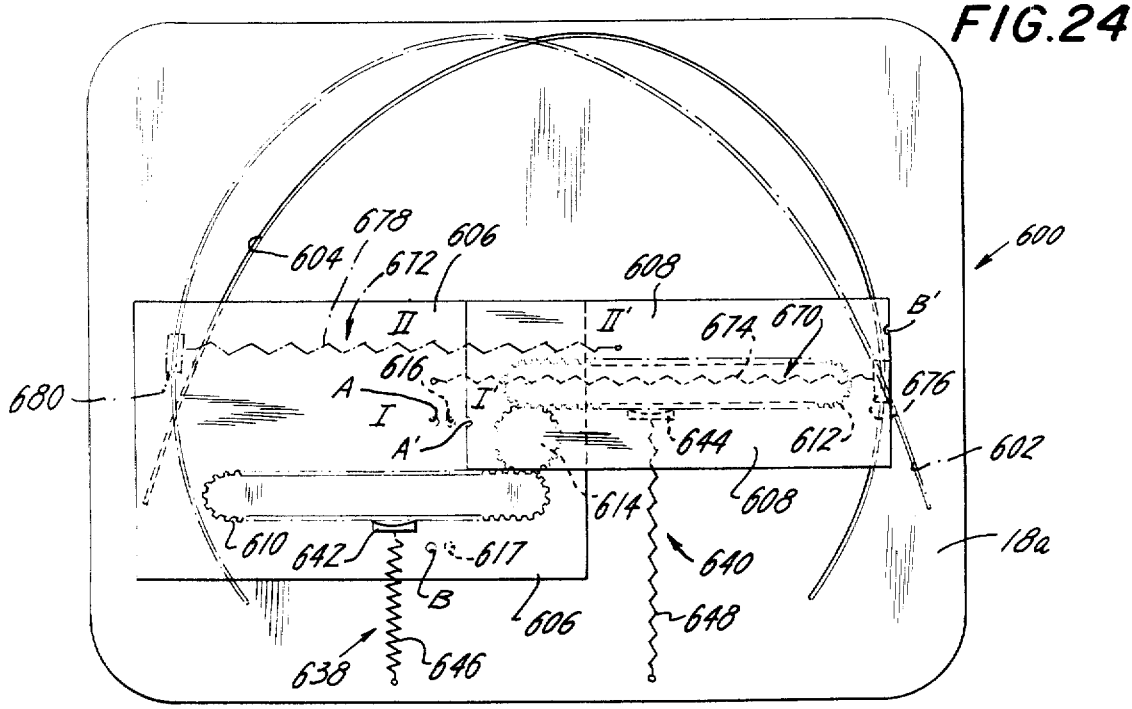
FIG. 24 is a view of another embodiment of the valve in accordance with the present invention wherein one of the outer cover members has been removed.
Figure 25:
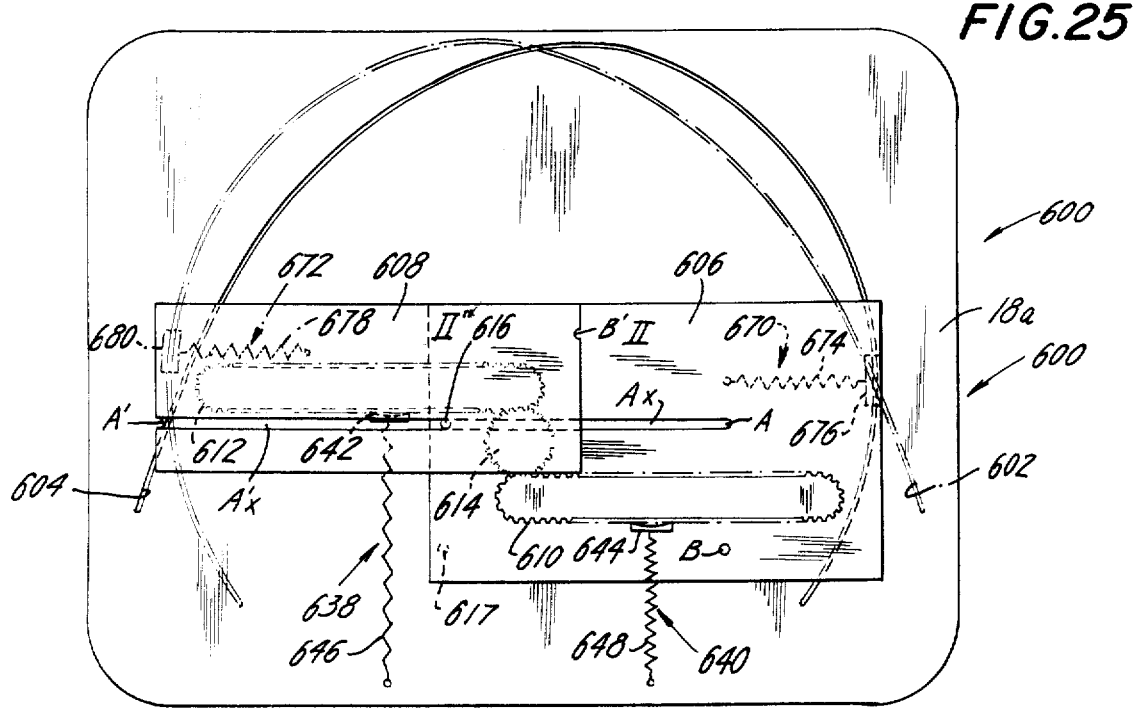
FIG. 25 is a view of the valve shown in FIG. 24 wherein one working area in each of the valve plates is worn.

In operation, the valve 600 may be moved from its open position into its closed position as shown in FIG. 24 by rotating main gear 614 to cause the plates 606 and 608 to move towards each other into overlapping position so that opening A of plate 606 and notched portion A' of plate 608 are out of alignment with openings 616 and 616a of cover plates 18a and 20a, respectively. After the plates 606 and 608 are subjected to repeated movement between open and closed positions, abrasive or corrosive materials passing through the opening A and notched portion A' will cause the working areas I and I' of plates 606 and 608, respectively, to wear about such portions such as shown by worn portions Ax and A'x in FIG. 25. Thus, as in the case of valves 400 and 500, in order to continue to be able to close the valve 600, it will be necessary to move plates 606, 608 into increasing overlapping relation until the worn portions become so large that working areas I and I' can no longer close the valve as shown in FIG. 25. Accordingly, in order to reposition the plates 606 and 608 so that the second working areas II and II' may be employed to close off the openings 617, 617a in cover plates 18a, 20a, respectively, (during which time openings 616, 616a are maintained in a closed disposition), the main gear 614 is simply rotated clockwise thereby causing the plates 606, 608 which engage ridges or grooves 602, 604, respectively, via biased carriages 676, 680 respectively, to rotate or revolve about each other as shown in FIG. 26 until they assume the position shown in FIG. 27. As shown in FIG. 27, the working areas II, II' of plates 606, 608, respectively, via opening B and notched portion B', are now in position to cooperate to open or close off the openings 617, 617a of valve 600.

Figures 25A, 25B:
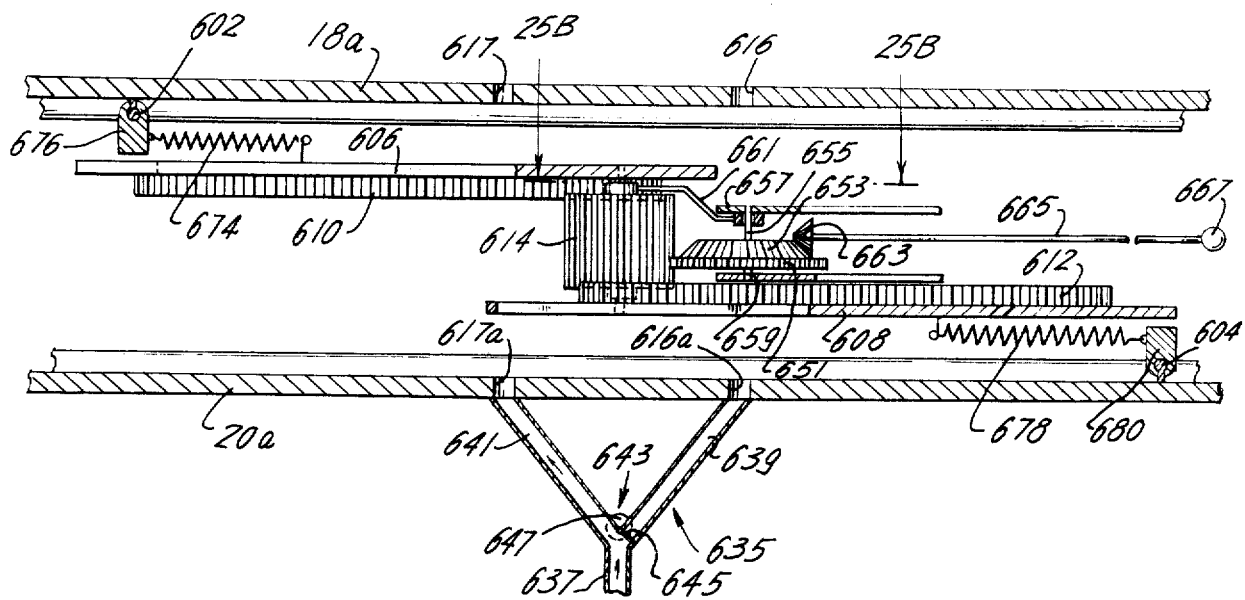
FIG. 25A is a side view of a gear arrangement employed to control the main gear of the valve embodiment of FIG. 24.
FIG. 25B is a fragmentary sectional view of a portion of the gear arrangement shown in FIG. 25A taken along lines 25B—25B thereof.

As indicated, when working areas I, I' of plates 606, 608, respectively, are functioning to open or close off openings 616, 616a in cover plates 18a, 20a, respectively, the openings 617, 617a in cover plates 18a, 20a are kept closed. This may be accomplished as shown in FIG. 25A through the use of the Y-shaped connection indicated generally by the numeral 635. The leg 637 of the Y-shaped connection 635 is connected to a source of material to be passed through valve 600, while the leg 639 extending from leg 637 is connected to opening 616a and the leg 641 extending from leg 637 is connected to opening 617a as shown in FIG. 25A. Disposed at the juncture of leg 637 and legs 639, 641 is a valve or flow control device 643 which includes pivotally mounted flap 645 which may be connected to a knob or handle 647 which sets the position of flap 645 relative to legs 639 and 641 depending upon whether leg 639 is to be opened or closed or leg 641 is to be closed or opened. Thus, where working areas I, I' of plates 606, 608, respectively, are to open or close off openings 616, 616a, the flap 645 will be positioned to close off leg 641 so that flow of material through leg 637 must be directed into leg 639 and through opening 616a in cover plate 20a. Moreover, where working areas II, II' of plates 606, 608, respectively, are to open or close off openings 617, 617a, the flap 645 will be positioned to close off leg 639 so that flow of material through leg 637 must pass into leg 641 and through opening 617a in cover plate 20a.

The main gear 614 may be controlled and rotated from externally of valve 600 through use of any conventional gear arrangement, one example of which is shown in FIGS. 25A and 25B. As shown in FIGS. 25A and 25B, main gear 614 is rotated through gear 651 which is fixedly connected to beveled gear 653, the gears 651, 653 being fixedly connected to common shaft 655. The shaft 655 is rotatably mounted in trunnions 657 and 659 which are connected to portions of cover plates 18a, 20a. Shaft 655 is connected to shaft 615 upon which main gear 614 is mounted through linking member 661 to ensure that gear 651 is retained in constant contact with main gear 614. The beveled gear 653 is rotated via tapered gear 663 which is connected to shaft 665 which extends through the cover plates externally of valve 600 and terminates in handle 667. Thus, rotation of handle 667 will cause rotation of shaft 665 and gear 663 which will in turn cause rotation of gears 653 and 651 about shaft 655 thereby causing rotation of main gear 614 about shaft 615.

It will be appreciated that the shaft 615 will be retained between the plates 606, 608 so as to maintain the main gear 614 in a fixed position.

Although the plates 606, 608 will slide by the ends of the shaft 615, the shaft 615 will remain fixed since shaft 615 is maintained in a fixed position by means of linking member 661.

Figure 28:
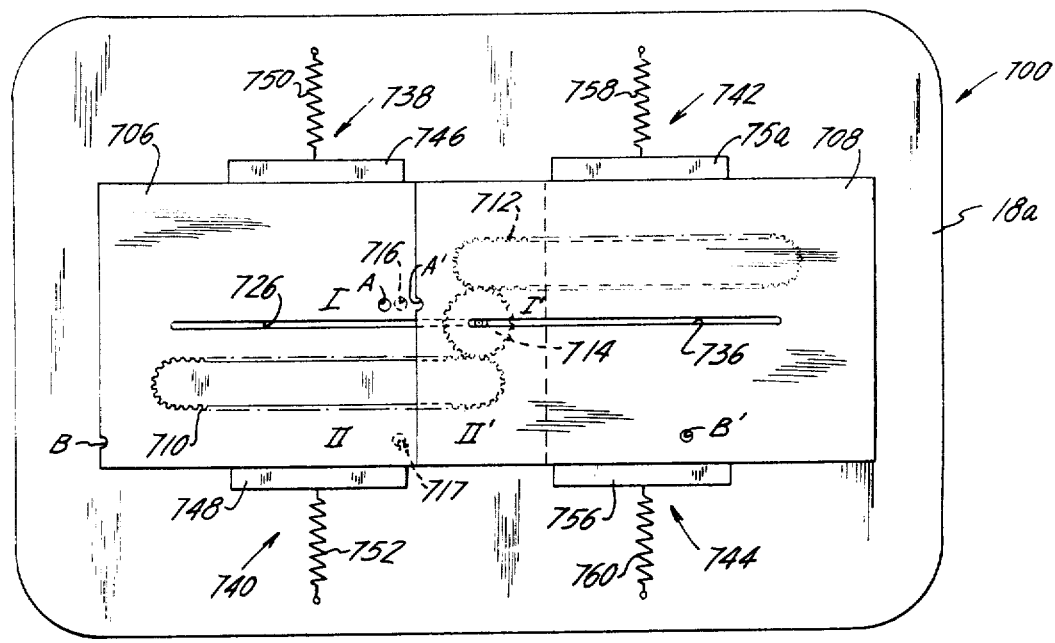
FIG. 28 is a view of yet another embodiment of the valve in accordance with the present invention wherein one of the outer cover members has been removed.
Figure 29:
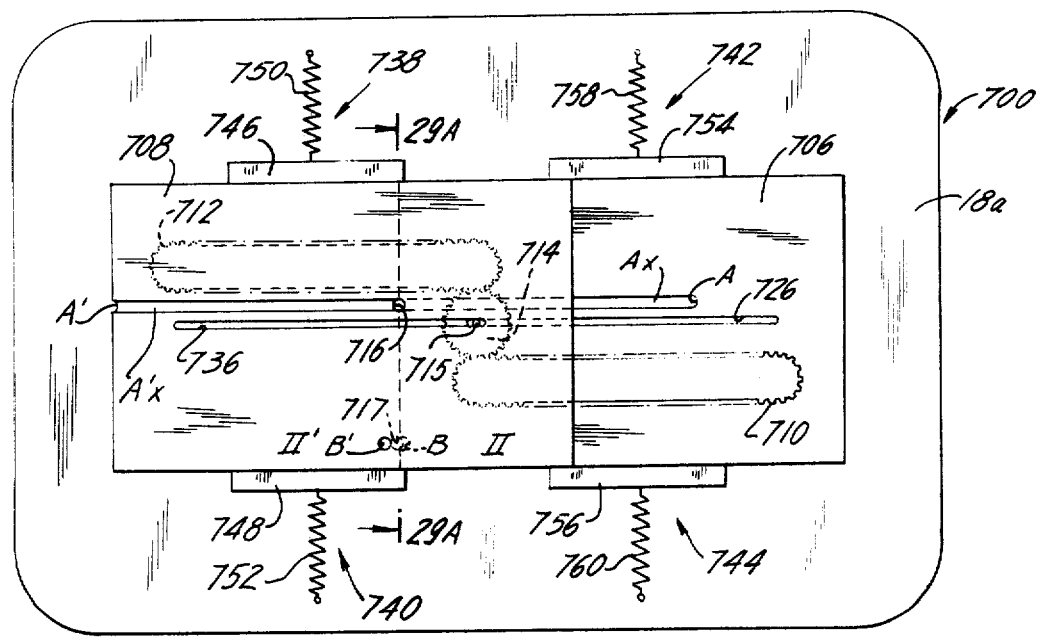
FIG. 29 is a view of the valve shown in FIG. 28 wherein one working area in each of the valve plates is worn.

Referring now to FIGS. 28, 29 and 29A there is shown yet another valve embodiment of the invention represented by the numeral 700. The valve 700 includes cover plates 18a and 20a, (cover plate 20a being shown in FIG. 29A) which are joined to each other by conventional means such as bolts or screws as described with respect to valves 400 and 500. The closure members employed in valve 700 comprise plates 706 and 708 which include elongated gears 710 and 712, respectively, connected thereto by conventional securing means. As in valve embodiments 400 and 600, the gear teeth of each of the gears 710, 712 are adapted to engage main gear 714 which allows movement of the closure members with respect to each other to open and close off the openings 716, 716a in cover plates 18a and 20a, respectively, or the openings 717, 717a in cover plates 18a, 20a, respectively.

The closure members 706, 708 are designed so that they can include two elongated working areas, I, II and I', II'', respectively. Thus, when working areas I, I' (adapted to close off openings 716, 716a) of closure members 706, 708, respectively, are worn, the working areas II, II' can be employed to open or close off openings 717, 717a (while openings 716, 716a are maintained in a closed disposition).

The elongated gears 710, 712 of closure members or plates 706, 708, respectively, are maintained in constant contact with main gear 714 through the use of biasing means 738, 740 for plate 706 or 708 and biasing means 742, 744 for plate 708 or 706. The biasing members 738, 740 each include a contact or base member 746, 748, respectively, connected to one end of a spring 750, 752 while the other end of springs 750, 752 are connected to a portion of cover plate 18a; the biasing members 742, 744 each include a contact or base member 754, 756, respectively, connected to end of spring 758, 760, the other end of such springs being connected to a portion of cover plate 20a.

The closure members or plates 706, 708 include elongated slots 726, 736, respectively, which engage shaft 715 of main gear 714 and allow the plates 706, 708 to move toward and away from main gear 714 without being obstructed thereby.

In operation, the valve 700 may be moved from open to closed positions by rotating main gear 715 to cause the plates 716, 708 to move towards each other into overlapping position so that opening A of plate 706 and notched portion A' of plate 708 are out of alignment with openings 716, 716a. After the plates 706, 708 are subjected to repeated movement between open and closed positions, abrasive or corrosive materials passing through opening A and notched portion A' will cause the working areas I and I' to wear such as shown by worn portions Ax and A'x in FIG. 29. Thus, as in previously described valve embodiments, in order to continue to be able to close the valve 700, it will be necessary to move plates 706, 708 into increasing overlapping relation until the worn portions become so large that working areas I, I' can no longer cooperate to close valve 700, as shown in FIG. 29. In such case, the openings 716, 716a may be simply closed off as described with respect to FIG. 25A, and as shown in FIG. 29A, so that the second working areas II, II' including opening B' of plate 708 and notched portion B of plate 706 can be employed to open or close off openings 717, 717a in the cover plates 18a, 20a, by rotating the main gear 714 in the opposite direction from that when working areas I, I' were employed to close off openings 716, 716a.

In this embodiment, as in all of the embodiments described hereinbefore, the closure members are adapted for long and continued use because they can be repositioned with respect to the valve opening so that the unworn portions of these closure members can be employed in conjunction with each other and be moved into and out of overlapping relationship to close off and open the multiple plate valve of the invention.

It will also be appreciated that the conduits leading to and from the valves of the invention (such as conduits 14 and 16) as well as the apertures 22 and 24 and corresponding conduits and apertures in other valve embodiments may include internally and removably positionable wear sleeves. Thus, when the sleeves wear due to flow of abrasives therethrough, they may easily be replaced without the need for replacing the outer plates 18a or 20a and connecting conduits (or equivalent components in other valve embodiments of the invention).

What is claimed is:

1. A valve designed to continue to function to close off a conduit even after portions of the valve have worn, said valve comprising, in combination, a body portion including a pair of outer cover members each having an aperture therein;

at least first and second closure members retained between said outer cover members, each of said closure members including a plurality of gear teeth extending substantially across each of said closure members, said gear teeth being adapted to engage gear means;

gear means for positioning said first and second closure members relative to each other and to said apertures in said outer cover plates, said gear means being in engagement with said gear teeth of said first and second closure members, so that movement of said gear means causes movement of at least one of said first and second closure members relative to each other so that said closure members may cooperate with each other to overlap over at least one of said apertures in said outer cover plates to close off said aperture, and as said first and second closure members wear, at least one of said closure members may be moved by said gear means so that unworn portions of said closure members will overlap and continue to cooperate with each other to close off said aperture in said outer cover members; and means for maintaining said gear teeth of said closure members in engagement with said gear means.

2. The valve as defined in claim 1 wherein said first and second closure members comprise first and second plates, and at least one of said outer cover members includes guide means defining a path of travel for said first and second plates while maintaining said gear teeth of said plates in engagement with said gear means.

3. The valve as defined in claim 2 wherein said first and second plates are of generally circular configuration, and said guide means in said at least one outer cover member comprises a ridge or groove of generally curve configuration and said gear teeth defining a path across said first and second plates, said path substantially paralleling the generally curved configuration of said guide means.

4. The valve as defined in claim 3 wherein said first and second circular plates each includes an extension member having gear teeth thereon, said gear teeth defining a gear path across said plates and said extension members thereof.

5. The valve as defined in claim 2 wherein said gear means includes a gear in engagement with said gear teeth of said first and second plates, and a shaft a first end of which is connected to said gear, said shaft being adapted to be moved from side to side so as to adjust the position of said first and second plates and said gear relative to each other and said apertures in said outer cover members when one plate is worn more than the other plate.

6. The valve as defined in claim 5 wherein said gear is beveled.

7. The valve as defined in claim 6, further including gear moving means connected to said shaft, a portion of said gear moving means extending outside of said outer cover members and adapted to be manipulated so as to rotate said shaft and gear and to laterally move said shaft, gear and plates relative to each other and said apertures in said outer cover members.

8. A valve designed to continue to function to close off a conduit even after portions of the valve have worn, said valve comprising, in combination, a body portion including a pair of outer cover members, each of said cover members having an aperture therein;

at least first and second closure members retained between said outer cover members, said closure members comprising first and second plates which are adapted to move between overlapping and non-overlapping positions and to cooperate with each other and close off at least one of said apertures in said outer cover members;

means associated with each of said first and second plates for defining a path of travel of said plates as said plates are urged toward or away from said apertures in said outer cover members; and plate moving means connected to said plates for moving said plates with respect to each other and said apertures in said outer cover members, whereby said overlapping portions of said plates will be positioned in alignment with said aperture in said outer cover members to close off said aperture, and as said plates wear, said plates may be moved by said plate moving means so that unworn portions of said plates will overlap and continue to cooperate with each other to close off said aperture in said outer cover members.

9. The valve as defined in claim 8 wherein said means associated with each of said first and second plates for defining a path of travel therefor comprise first and second pivot means, each connected to at least one of said outer second pivot means, each connected to at least one of said outer cover members, said first and second plates being eccentrically mounted to said first and second pivot means, respectively.

10. The valve as defined in claim 9 wherein said plate moving means is connected to said first and second plates so as to cause simultaneous movement of said plates.

11. The valve as defined in claim 10 wherein said plate moving means includes at least first and second leg portions, said first and second leg portions each engaging an off-centered portion of said first and second plates, respectively, so that movement of said plate moving means toward said apertures in said outer cover members causes said first and second plates to pivot into overlapping relationship with each other the overlapping portions of said plates being disposed over at least one of the apertures in said outer cover members to close off the same, and movement of said plate moving means away from said apertures causes said first and second plates to move out of overlapping relationship with each other and away from said apertures in said cover plates so as to open said apertures.

12. The valve as defined in claim 11 wherein said first and second plates each include an off-center mounted pin and said first and second leg portions of said plate moving means each includes a slot to engage respective pins of said first and second plates, said slots being angled downwardly toward each other and said apertures in said cover plates.

13. The valve as defined in claim 12 wherein said first and second plates are of circular configuration.

14. The valve as defined in claim 8 wherein said means associated with each of said first and second plates for defining a path of travel therefor comprises at least first guide means connected to at least one of said outer cover members and in contact with said first plate, and at least second guide means connected to at least one of said outer cover members and in contact with said second plate, said first and second guide means defining a path of movement for said first and second plates as said plates are urged toward said apertures in said outer cover members.

15. The valve as defined in claim 14 further including first stop means connected to at least one of said outer cover members and in close proximity to said first plate, and second stop means connected to at least one of said outer cover members and in close proximity to said second plate, said first and second stop means preventing undesired movement of said plates away from said apertures in said outer cover members.

16. The valve as defined in claim 15 wherein said plate moving means is connected to said first and second plates so as to cause simultaneous movement of said plates.

17. The valve as defined in claim 16 wherein said plate moving means includes at least first and second leg portions, said first and second leg portions engaging an off-centered portion of said first and second plates, respectively, so that movement of said plate moving means towards said apertures in said outer cover members causes said first and second plates to pivot into overlapping relationship with each other, the overlapping portions of said plates being disposed over at least one of the apertures in said outer cover members to close off the same, and movement of said plate moving means away from said apertures causes said first and second plates to move out of overlapping relationship with each other and away from said apertures in said cover plates so as to open said apertures.

18. The valve as defined in claim 17 wherein said first and second plates each include an off-center mounted pin and said first and second leg portions of said plate moving means each includes a slot to engage respective pins of said first and second plates, said slots being angled downwardly toward each other.

19. The valve as defined in claim 18 wherein said first and second plates are of circular configuration.

20. The valve as defined in claim 9 wherein said plate moving means is connected to said first and second plates so as to cause simultaneous movement of said plates.

21. The valve as defined in claim 20 wherein said plate moving means includes at least first and second leg portions one end portion of each being pivotally connected to cross members, and the other end portion of each of said first and second leg portions engaging an off-centered portion of said first and second plates, respectively, so that movement of said cross members toward said apertures in said outer cover members causes said first and second plates to move into overlapping relationship with each other, the overlapping portions thereof being disposed over at least one of the apertures in said outer cover members to close off the same, and movement of said cross members away from said apertures causes said first and second plates to move out of overlapping relationship so as to open said apertures.

22. The valve as defined in claim 14 wherein said plate moving means is connected to said first and second plates so as to cause simultaneous movement of said plates.

23. The valve as defined in claim 22 wherein said plate moving means includes at least first and second leg portions one end portion of each being pivotally connected to cross members, and the other end portion of each of said first and second leg portions engaging an off-centered portion of said first and second plates, respectively, so that movement of said cross members towards said apertures in said outer cover members causes said first and second plates to move into overlapping relationship with each other, the overlapping portions thereof being disposed over at least one of the apertures in said outer cover members to close off the same, and movement of said cross members away from apertures causes said first and second plates to move out of overlapping relationship so as to open said apertures.

24. The valve in accordance with claim 8 wherein said means associated with each of said first and second plates for defining a path of travel therefor comprise a first pair of spaced apart upper and lower track members in the form of a pair of ridges or grooves disposed in at least one of said outer cover members and defining a path of travel for said first plate toward or away from said second plate and said apertures in said outer cover members, and a second pair of spaced apart upper and lower track members in the form of a pair of ridges or grooves disposed in at least one of said outer cover members and defining a path of travel for said second plate toward or away from said first plate and said apertures in said outer cover members.

25. The valve as defined in claim 24 wherein said plate moving means is connected to said first and second plates so as to cause simultaneous movement of said plates.

26. The valve as defined in claim 25 wherein said plate moving means includes at least first and second leg portions, said first and second leg portions engaging off-centered portions of said first and second plates, respectively, so that movement of said plate moving means towards said apertures in said outer cover members causes said first and second plates to pivot the overlapping relationship with each other, the overlapping portions of said plates being disposed over at least one of the apertures in said outer cover members to close off the same, and movement of said plate moving means away from said apertures causes said first and second plates to move out of overlapping relationship with each other and away from said apertures in said cover plates so as to open said apertures.

27. The valve as defined in claim 17 wherein said first and ssecond plates each include an off-center mounted pin and said first and second leg portions of said plate moving means engage respective pins of said first and second plates.

28. The valve as defined in claim 27 wherein said first and second plates are of circular configuration.

29. The valve as defined in claim 8 wherein said means associated with each of said first and second plates for defining a path of travel therefor comprise a upper track member and a lower track member, said track members being in the form of ridges or grooves disposed in at least one of said outer cover members and defining a common path of travel for said first and second plates toward or away from said apertures in said outer cover members, and said plate moving means comprises first and second leg portions, one end of which is pivotally connected to a cross member, the other end of said first leg portion being pivotally connected to an off-centered portion of said first plate, and the other end of said second leg portion being pivotally connected to an off-centered portion of said second plate; whereby pivoting of said cross member downwardly toward said apertures in said outer cross members causes said first leg to pivot toward said aperture, said first leg carrying said first plate toward said aperture and causing said second leg to pivot toward said aperture, said second leg carrying said second plate toward said aperture so that said first and second plates overlap over at least one of said apertures to close off the same, and pivoting of said cross member upwardly or in the opposite direction causes said first and second plates to move out of overlapping relationship with each other and away from said apertures in said cover plates so as to open said apertures.

30. The valve as defined in claim 29 wherein said upper and lower track members are parallel and are angled downwardly to the horizontal at an angle ranging from about 10° to about 40°.

31. The valve as defined in claim 30 wherein said first plate is disposed between said track members at a lower position than in said second plate, and said first leg portion is pivotally connected to an off-centered upper portion of said first plate and said second leg portion is pivotally connected to an off-centered lower portion of said second plate.

32. A valve designed to continue to function to close off a conduit even after portions of the valve have worn, said valve comprising, in combination, a body portion including a pair of outer cover members, each of said cover members having an aperture therein;

at least first and second closure members retained between said outer cover members, said closure members comprising first and second plates which are adapted to move between overlapping and non-overlapping positions and to cooperate with each other and close off at least one of said apertures in said outer cover members;

first and second plate gears connected to an off-centered portion of each of said first and second closure members, respectively, so that rotation of said plate gears will cause corresponding eccentric rotation of said closure members toward each other into overlapping positions in alignment with at least one of said apertures, or away from each other into non-overlapping positions and out of alignment with said apertures;

at least first and second auxiliary gears disposed in engagement with said first and second plate gears, respectively; and a drive gear disposed in engagement with each of said auxiliary gears, whereby rotational movement of said drive gear causes rotational movement of said auxiliary gears which in turn causes rotational movement of said plate gears and said first and second closure members, so that said first and second closure members may be moved into overlapping relationship with each other, the overlapping portions thereof being positioned in alignment with at least one of said apertures in said outer cover members to close off said apertures, and as said overlapping portions of said closure members wear, said closure members may be moved by said drive gear, auxiliary gears and plate gears so that unworn portions of said closure members will overlap and continue to cooperate with each other to close off at least one of said apertures in said outer cover members, and so that said closure members may be moved away from each other and said apertures to open said apertures; and means for maintaining said auxiliary gears in engagement with said plate gears and for maintaining said drive gear in engagement with said auxiliary gears.

33. A valve comprising, in combination, a body portion including a pair of outer cover members, each having an aperture therein;

at least first and second closure members retained between said outer cover members, said closure members being adapted to move so that a portion of one of said closure members is in alignment with at least one of said apertures in said outer cover members to close off said aperture, a common connecting member portions of which are connected to portions of said first and second closure members, respectively, said connecting member being pivotally mounted between said outer closure members, and moving means for pivotally moving said connecting member, whereby a portion of one of said closure members is adapted to be moved into or out from alignment with at least one of said apertures in said outer cover members to open or close the same and after said one of said closure members is worn, said moving means is adapted to pivotally move said connecting member so that said worn closure member is moved away from said apertures, and an unworn portion of the other closure member is moved into alignment with at least one of said apertures to close off the time.

34. The valve as defined in claim 33 wherein said connecting member comprises first and second leg portions connected to said first and second closure members, respectively.

35. The valve as defined in claim 33 wherein said first and second leg portions are connected to off-centered portions of said first and second closure members, respectively.

36. The valve as defined in claim 33 wherein said moving means comprises gear means connected to said connecting member and adapted to cause pivotal movement of the same.

37. A valve designed to continue to function to close off a conduit even after portions of the valve have worn, said valve comprising, in combination, a body portion including a pair of outer cover members, each of said cover members having at least one aperture or opening therein;

at least a pair of closure members comprising first and second plates retained between said outer cover members, said first plate having at least two working areas, including a first elongated working area I and a second elongated working area II, said second plate having at least two working areas including a first elongated working area I' and a second elongated working area II', said first working areas I, I' being adapted to be positioned to work in conjunction with one another so as to be in or out of alignment with each other and with at least one of the apertures in said outer cover members, each of said first and second closure members further including a plurality of gear teeth which are adapted to engage gear means;

gear means for positioning said first and second closure members relative to each other and to said apertures in said outer cover members, said gear means being in engagement with said gear teeth of said first and second closure members so that movement of said gear means causes movement of said first and second closure members toward or away from each other so that said closure members may be positioned to cooperate with each other to open or close off at least one of said apertures in said outer cover plates, and so that after the first or second working areas of said first and second plates are worn, movement of said gear means causes said first and second plates to move relative to each other to present unworn second or first working areas for use in closing off at least one of said apertures in said outer cover members; and means for maintaining said gear teeth of said first and second plates in engagement with said gear means.

38. The valve in accordance with claim 37 wherein said means for maintaining said gear teeth of said first and second plates in engagement with said gear means comprises said outer cover members.

39. A valve in accordance with claim 37 wherein at least one of said outer cover members includes grooves or ridges therein for guiding said first and second plates as said plates are revolved about each other by said gear means.

40. The valve as defined in claim 37 wherein said gear teeth of said first and second closure members divide said closure members into first and second working areas.

41. The valve as defined in claim 37 wherein said first working area I of said first closure member includes an opening A and the first working area I' of said second closure member includes an opening A', the openings A, A' being adapted to be moved into and out of alignment with said openings in said outer cover members, and said second working area II of said first closure member includes an opening B and the second working area II' of said second closure member includes an opening B', the first and second closure members including openings B, B' being adapted to be moved via said gear means into and out of alignment with said openings in said outer cover members to open or close in the same after said first working areas I, I' have worn.

42. The valve as defined in claim 41 wherein said gear teeth of said first closure members comprises a first elongated gear, and said gear teeth of said second closure member comprises a second elongated gear, and the first working area I of said first closure member is disposed below said first gear, and the first working area I' of said second closure member is disposed above said second gear, said working areas I and I' working in conjunction with one another via said gear means to close off said valve, said first working area I of said first closure member and said second working I' area of said second closure member between worn, the first and second closure members are repositioned by means of said gear means so that the second working area II disposed above said first gear of said first closure member and the second working area II', disposed below said second gear of said second closure member work in conjunction with one another through said gear means to close off said valve.

43. The valve as defined in claim 42 wherein said gear means includes a shaft extending through at least one of said outer cover members for use in rotating said gear means, and said first and second closure members include slots therein through which said shaft of said gear means passes so that as said gear means is rotated, said closure members move toward or away from said openings in said outer cover members and said slots allow unrestricted movement of said closure members relative to said gear means and said shaft connected to said gear means.

44. The valve as defined in claim 43 wherein said first and second closure members include slots adapted to allow said shaft of said gear means to pass through, said slots being out of alignment with said openings in said outer cover members.

45. The valve as defined in claim 39 wherein said ridges or grooves in said outer corner members comprise an upper ridge or groove and a lower ridge or groove.

46. The valve as defined in claim 45 wherein said gear teeth of said first closure member are disposed above said first working area I and above said second working area II with said first working area I being disposed between said gear teeth and said second working area II thereof, and said gear teeth of said second closure member are disposed below said first working area I' and said second working area II' with said second working area II' being disposed between said gear teeth and said first working area I'.

47. The valve as defined in claim 46 wherein said first and second closure members include slots adapted to allow said shaft of said gear means to pass through, said slots being out of alignment with said openings in said outer cover members.

48. The valve as defined in claim 46 including first biased guide means connected to said first closure member and one of said upper or lower groove or ridge, and second biased guide means connected to said second closure member and to the other of said lower or upper groove or ridge, said first and second biased guide means being adapted to control the path of travel of and guide said first and second closure means as they are rotated by said gear means.

49. The valve as defined in claim 46 wherein said first working area I of said first closure member includes an opening A and the first working area I' of said second closure member includes an opening A', the openings A, A' being adapted to be moved into and out of alignment with said openings in said outer cover members, and said second working area II of said first closure member includes an opening B and the second working area II' of said second closure member includes an opening B', the first and second closure members including openings B, B' being adapted to be moved via said gear means into and out of alignment with said openings in said outer cover members to open or close the same after said first working areas I, I' have worn.

50. The valve as defined in claim 39 wherein said ridges or grooves in said outer cover member comprise first and second ridges or grooves disposed in superimposed overlapping relation with each other.

51. The valve as defined in claim 50 wherein said gear teeth of said first closure member are disposed above said first working area I and above said second working area II thereof, said gear teeth of said second closure member are disposed between said first working area I' and said second working area II' thereof, so that initially said first working areas I, I' of each of said closure members work in conjunction with one another to close off said valve, and after said first working areas I, I' have worn, continued rotation of said gear means causes said first and second closure members to rotate in the same direction at the same time, whereby said closure members are repositioned so that said second working areas II, II' of said closure members are positioned to cooperate with each other to close off said valve.

52. The valve as defined in claim 51 wherein each of said outer cover members includes first and second opening therein which first openings are in alignment with each other, and said second openings are in alignment with each other.

53. The valve as defined in claim 52 wherein said first closure member is larger than said second closure member and said gear teeth are positioned in said first closure member to divide said first closure member into upper and lower working areas I, II, respectively, and said gear teeth of said second closure member divide said second closure member into upper and lower working areas II', I', respectively, so that in a first working position said upper working area I of said first closure member and said lower working area I' of said second closure member are adapted to be moved via said gear means to close off at least one of said first openings in said outer close off at least one of said first openings in said outer cover members to close off said valve, and when said upper working area I of said first closure member and said lower working area I' of said second closure member are worn, said gear means is adapted to cause said first and second closure members to revolve about each other with the aid of said ridges or grooves so that the lower working area II of said first closure member and the upper working area II' of said second closure member may be moved via said gear means to cooperate with one another to close off at least one of said second openings in said outer cover members so as to close off said valve.

54. The valve as defined in claim 53 wherein said first and second openings in each of said outer cover members is connected to a T-shape like conduit which conduit includes means for closing off one or both of said first and second openings in each of said outer cover members depending upon the position of said first and second closure members relative to said first and second openings, so that when said closure members are positioned to open or close said first openings, said last-mentioned means will close off said second openings, and when said closure members are positioned to open or close said second openings said last-mentioned means will close off said first openings.

55. The valve as defined in claim 53 further including first biased guide means connected to said first closure member and said first ridge or groove, and second biased guide means connected to said second closure member and said second ridge or groove, said first and second biased guide means being adapted to guide the first and second closure members as they are revolved past each other by means of said gear means.

56. The valve as defined in claim 54 wherein said first working area I of said first closure member includes an opening A and the first working area I' of said second closure member includes an opening A', the openings A, A' being adapted to be moved into and out of alignment with said first openings in said outer cover members, and said second working area II of said first closure member includes opening B and the second working area II' of said second closure includes an opening B', the first and second closure members including openings B, B' being adapted to be moved via said gear means into and out of alignment with said second openings in said outer cover members to open or close the same after said first working areas I, I' have worn.

57. The valve in accordance with claim 37 wherein each of said outer cover members include first and second openings therein which first openings are in alignment with each other and said second openings are in alignment with each other.

58. The valve as defined in claim 57 wherein said gear teeth of said first closure member are disposed between said first working area I and said second working area II, and said gear teeth of said second closure member are disposed above said first working area I' and said second working area II' with said first working area I' being disposed between said gear teeth and said second working area II'.

59. The valve as defined in claim 58 wherein said first working area I of said first closure member includes an opening A and the first working area I' of said second closure member includes an opening A', the openings A, A' being adapted to be moved into and out of alignment with said first openings in said outer cover members, and said second working area II of said first closure member includes an opening B and the second working area II' of said second closure includes an opening B', the first and second closure members including openings B, B' being adapted to be moved via said gear means into and out of alignment with said second openings in said outer cover members to open or close the same after said first working areas I, I' have worn.

60. The valve as defined in claim 59 wherein said first and second openings in each of said outer cover members is connected to a T-shape like conduit which conduit includes means for closing off one or both of said first and second openings in each of said outer cover members depending upon the position of said first and second closure members relative to said first and second openings, so that when said closure members are positioned to open or close said first openings, said last-mentioned means will close off said second openings, and when said closure members are positioned to open or close said second openings said last mentioned means will close off said first openings.

61. The valve as defined in claim 60 wherein said first and second closure members include elongated slots adapted to engage the shaft of said gear means.

* * * * *

UNITED STATES PATENT AND TRADEMARK OFFICE
CERTIFICATE OF CORRECTION

PATENT NO. : 3,945,605
DATED : March 23, 1976
INVENTOR(S) : Henry Fleischer

It is certified that error appears in the above—identified patent and that said Letters Patent are hereby corrected as shown below:

Column 6, line 2, after "downwardly", insert --toward--.

Column 9, line 39, "alogn" should read --along--.

Column 10, line 43, "oved" should read --moved--.

Column 12, line 22, "10$_v$" should read --10$^V$--.

Column 14, line 49, "30d and 32d" should read --30e and 32e--.

Column 23, line 55, "travel of" should read --travel for--.

Column 24, lines 4 and 5, delete "each connected to at least one of said outer second pivot means,"

Column 24, line 20, after "other" insert a comma (,).

Column 26, line 11, "pivot the" should read --pivot into--.

Column 26, line 21, "second" should read --second--.

Column 26, line 36, "one end" should read --one end of each--.

Column 29, line 14, delete "in".

Column 29, line 25, after "valve", insert --and after--.

Column 29, line 27, "between" should read --become--.

Column 29, line 53, "corner" should read --cover--.

Column 30, line 63, delete "openings in said outer close off at least one of said first".

Signed and Sealed this twenty-ninth Day of June 1976

[SEAL]

Attest:

RUTH C. MASON
*Attesting Officer*

C. MARSHALL DANN
*Commissioner of Patents and Trademarks*